US008155811B2

(12) United States Patent
Noffsinger et al.

(10) Patent No.: US 8,155,811 B2
(45) Date of Patent: Apr. 10, 2012

(54) SYSTEM AND METHOD FOR OPTIMIZING A PATH FOR A MARINE VESSEL THROUGH A WATERWAY

(75) Inventors: Joseph Forrest Noffsinger, Lees Summit, MO (US); Paul Kenneth Houpt, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 538 days.

(21) Appl. No.: 12/345,073

(22) Filed: Dec. 29, 2008

(65) Prior Publication Data

US 2010/0168942 A1    Jul. 1, 2010

(51) Int. Cl.
*B60L 15/00* (2006.01)
(52) U.S. Cl. .......................................... 701/21; 701/201
(58) Field of Classification Search ................ 701/1, 21, 701/23, 25, 26, 200–202; 440/1; 180/117, 180/184–186
See application file for complete search history.

(56) References Cited

U.S. PATENT DOCUMENTS

| | | |
|---|---|---|
| 3,519,805 A | 7/1970 | Thorne-Booth |
| 3,650,216 A | 3/1972 | Harwick et al. |
| 3,655,962 A | 4/1972 | Koch |
| 3,865,042 A | 2/1975 | DePaola et al. |
| 4,005,838 A | 2/1977 | Grundy |
| 4,041,283 A | 8/1977 | Mosier |
| 4,042,810 A | 8/1977 | Mosher |
| 4,181,943 A | 1/1980 | Mercer, Sr. |
| 4,253,399 A | 3/1981 | Spigarelli |
| 4,279,395 A | 7/1981 | Boggio et al. |
| 4,344,364 A | 8/1982 | Nickles et al. |
| 4,401,035 A | 8/1983 | Spigarelli et al. |
| 4,561,057 A | 12/1985 | Haley, Jr. et al. |
| 4,602,335 A | 7/1986 | Perlmutter |
| 4,711,418 A | 12/1987 | Aver, Jr. et al. |
| 4,735,385 A | 4/1988 | Nickles et al. |
| 4,794,548 A | 12/1988 | Lynch et al. |

(Continued)

FOREIGN PATENT DOCUMENTS

DE    3635667 A1    5/1988

(Continued)

OTHER PUBLICATIONS

International Search Report issued in connection with corresponding PCT Application No. PCT/US2009/066579 on Mar. 29, 2010.

(Continued)

*Primary Examiner* — Mary Cheung
(74) *Attorney, Agent, or Firm* — GE Global Patent Operation; John A. Kramer

(57) ABSTRACT

A system is provided for optimizing a path for a marine vessel through a waterway from an initial location to a final location. The system includes a propulsion system and a directional system on the marine vessel, which impart a selective propulsion force on the marine vessel at a selective direction based on a received propulsion command and direction command from a processor. The processor determines an optimal path for the marine vessel, an optimal propulsion command and optimal directional command at a respective incremental location along the optimal path, so to optimize a performance characteristic of the marine vessel. The determination of the optimal path, the optimal propulsion command and the optimal directional command is based on the initial location, the final location, at least one operating parameter, the performance characteristic, and navigational data of the waterway.

21 Claims, 13 Drawing Sheets

U.S. PATENT DOCUMENTS

| | | |
|---|---|---|
| 4,827,438 A | 5/1989 | Nickles et al. |
| 4,853,883 A | 8/1989 | Nickles et al. |
| 5,109,343 A | 4/1992 | Budway |
| 5,398,894 A | 3/1995 | Pascoe |
| 5,437,422 A | 8/1995 | Newman |
| 5,440,489 A | 8/1995 | Newman |
| 5,676,059 A | 10/1997 | Alt |
| 5,744,707 A | 4/1998 | Kull |
| 5,758,299 A | 5/1998 | Sandborg et al. |
| 5,785,392 A | 7/1998 | Hart |
| 5,828,979 A | 10/1998 | Polivka et al. |
| 5,950,967 A | 9/1999 | Montgomery |
| 6,112,142 A | 8/2000 | Shockley et al. |
| 6,125,311 A | 9/2000 | Lo |
| 6,144,901 A | 11/2000 | Nickles et al. |
| 6,269,034 B1 | 7/2001 | Shibuya |
| 6,273,771 B1 | 8/2001 | Buckley et al. |
| 6,308,117 B1 | 10/2001 | Ryland et al. |
| 6,487,488 B1 | 11/2002 | Peterson, Jr. et al. |
| 6,505,103 B1 | 1/2003 | Howell et al. |
| 6,516,727 B2 | 2/2003 | Kraft |
| 6,591,758 B2 | 7/2003 | Kumar |
| 6,609,049 B1 | 8/2003 | Kane et al. |
| 6,612,245 B2 | 9/2003 | Kumar et al. |
| 6,612,246 B2 | 9/2003 | Kumar |
| 6,615,118 B2 | 9/2003 | Kumar |
| 6,691,957 B2 | 2/2004 | Hess, Jr. et al. |
| 6,694,231 B1 | 2/2004 | Rezk |
| 6,732,023 B2 | 5/2004 | Sugita et al. |
| 6,763,291 B1 | 7/2004 | Houpt et al. |
| 6,789,005 B2 | 9/2004 | Hawthorne |
| 6,810,312 B2 | 10/2004 | Jammu et al. |
| 6,824,110 B2 | 11/2004 | Kane et al. |
| 6,845,953 B2 | 1/2005 | Kane et al. |
| 6,853,888 B2 | 2/2005 | Kane et al. |
| 6,856,865 B2 | 2/2005 | Hawthorne |
| 6,863,246 B2 | 3/2005 | Kane et al. |
| 6,865,454 B2 | 3/2005 | Kane et al. |
| 6,903,658 B2 | 6/2005 | Kane et al. |
| 6,915,191 B2 | 7/2005 | Kane et al. |
| 6,922,619 B2 | 7/2005 | Baig et al. |
| 6,957,131 B2 | 10/2005 | Kane et al. |
| 6,978,195 B2 | 12/2005 | Kane et al. |
| 6,980,894 B1 | 12/2005 | Gordon et al. |
| 6,996,461 B2 | 2/2006 | Kane et al. |
| 7,021,588 B2 | 4/2006 | Hess, Jr. et al. |
| 7,021,589 B2 | 4/2006 | Hess, Jr. et al. |
| 7,024,289 B2 | 4/2006 | Kane et al. |
| 7,036,774 B2 | 5/2006 | Kane et al. |
| 7,079,926 B2 | 7/2006 | Kane et al. |
| 7,092,800 B2 | 8/2006 | Kane et al. |
| 7,092,801 B2 | 8/2006 | Kane et al. |
| 2002/0059075 A1 | 5/2002 | Schick et al. |
| 2002/0096081 A1 | 7/2002 | Kraft |
| 2003/0213875 A1 | 11/2003 | Hess, Jr. et al. |
| 2004/0010432 A1 | 1/2004 | Matheson et al. |
| 2004/0133315 A1 | 7/2004 | Kumar et al. |
| 2004/0245410 A1 | 12/2004 | Kisak et al. |
| 2005/0065674 A1 | 3/2005 | Houpt et al. |
| 2005/0120904 A1 | 6/2005 | Kumar et al. |
| 2006/0064242 A1 | 3/2006 | Litvack et al. |
| 2006/0212188 A1 | 9/2006 | Kickbusch et al. |
| 2007/0219680 A1 | 9/2007 | Kumar et al. |
| 2008/0255757 A1 | 10/2008 | Bruce et al. |
| 2009/0141587 A1* | 6/2009 | Welker et al. .................. 367/16 |

FOREIGN PATENT DOCUMENTS

| | | |
|---|---|---|
| DE | 19726542 | 11/1998 |
| EP | 1 297 982 | 4/2003 |
| EP | 1365301 A2 | 11/2003 |
| FR | 2767770 | 3/1999 |
| JP | 59024314 A | 2/1984 |
| JP | 01187611 A | 7/1989 |
| JP | 2000194999 A | 7/2000 |
| WO | 2008096376 A1 | 8/2008 |

OTHER PUBLICATIONS

Written Opinion of the International Searching Authority issued in connection with corresponding PCT Application No. PCT/US2009/066579 on Mar. 29, 2010.

* cited by examiner

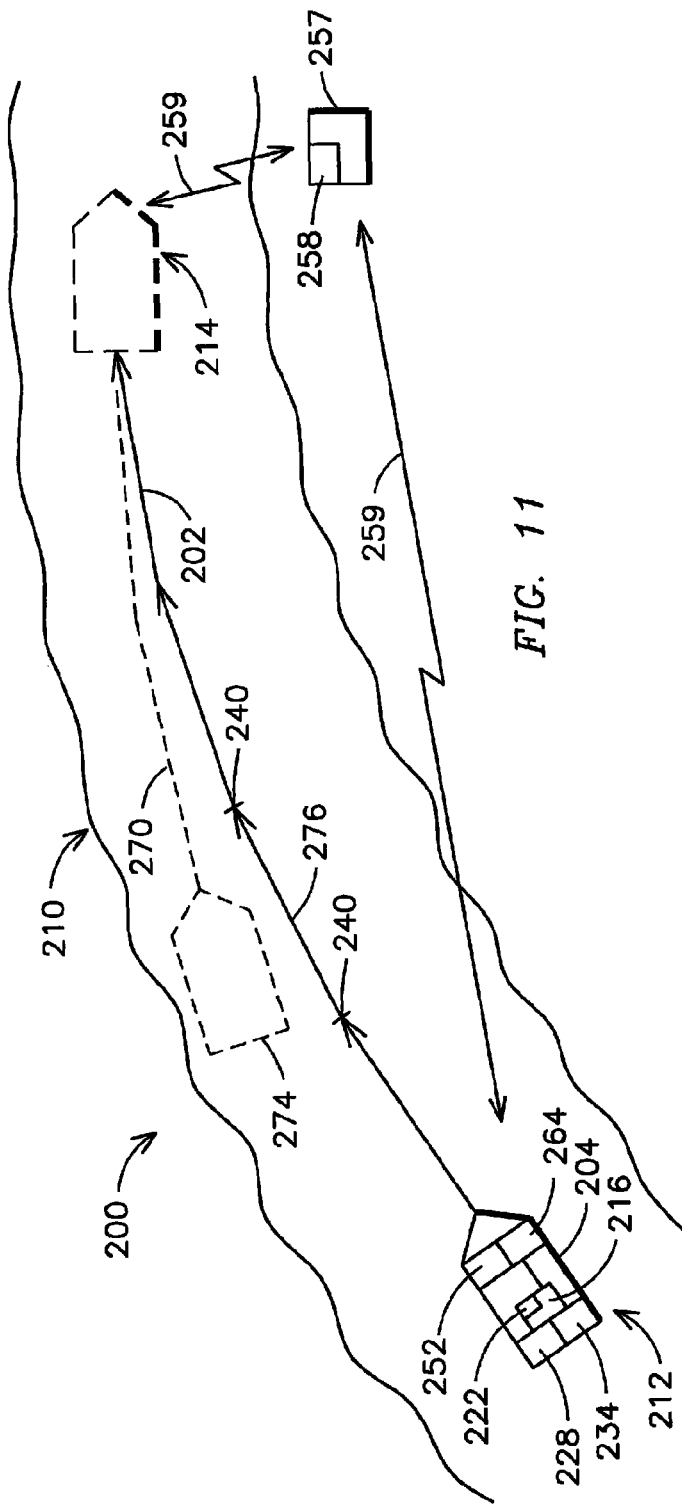
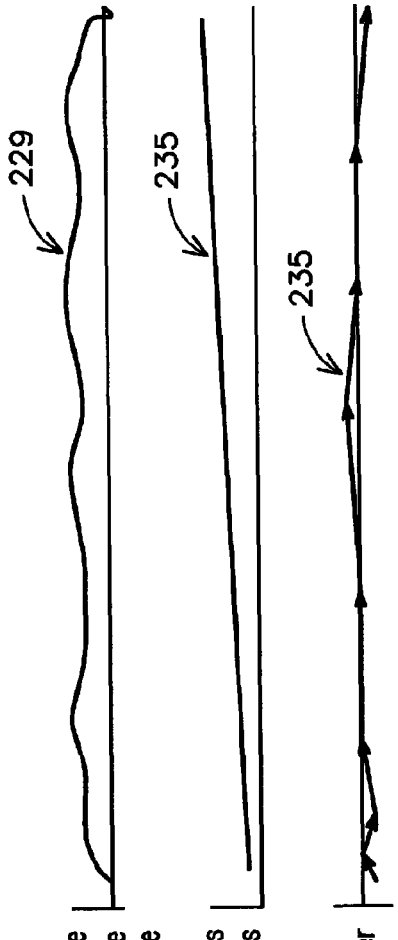
FIG. 11
FIG. 12
FIG. 13
FIG. 14

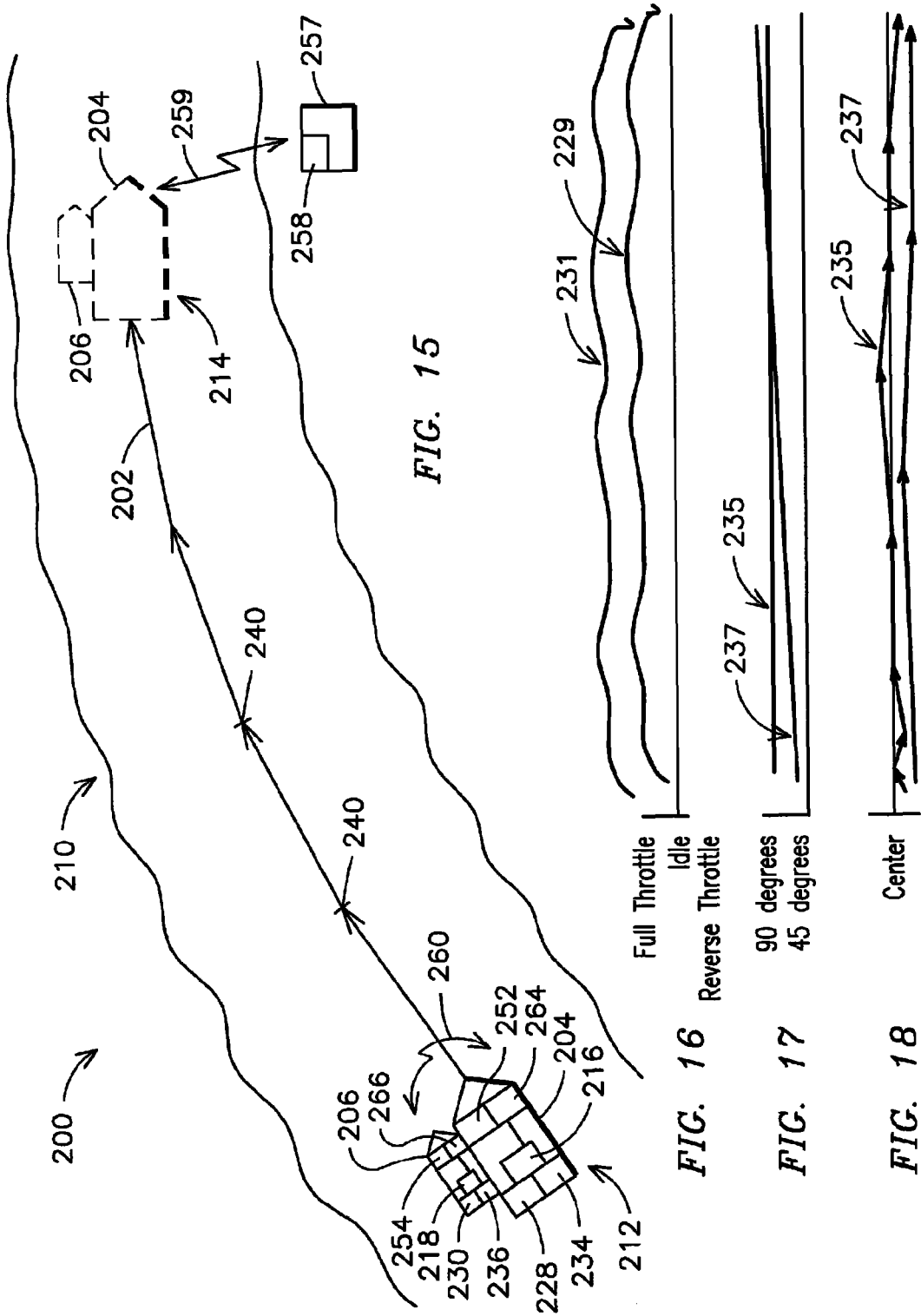

SYSTEM AND METHOD FOR OPTIMIZING A PATH FOR A MARINE VESSEL THROUGH A WATERWAY

BACKGROUND OF THE INVENTION

This invention relates to a marine vessel, and more particularly, to a system and method for controlling a marine vessel through a waterway.

Operation of a marine vessel through a waterway, such as moving a marine vessel from an initial location to a final location along the waterway, may involve consideration of numerous factors, which increases the difficulty and risk of the operation. For example, such factors as the presence of fixed or moving obstacles within the waterway, and/or dimensions of the waterway (e.g., width), increase the difficulty and risk of maneuvering the marine vessel within the waterway from the initial location to the final location. Additionally, others factors relating to the waterway may have limited foreseeability and yet have a significant impact on the operation of the marine vessel, such as water current, wind current, and/or other marine vessels which may suddenly obstruct a path of travel, and thus further complicate manual operation of the marine vessel from the initial location to the final location within the waterway. Also, at the final location, if the marine vessel is to be docked at a docking station, the maneuvering and/or turning of the marine vessel may involve highly complex calculations that require an operator with the highest operation skill, who may not be available, or the marine vessel may not be capable of being manually maneuvered by an operator of any skill level.

Thus, it would be advantageous to provide a system which provides an optimized path of a marine vessel through a waterway from an initial location to a final location, while taking into consideration such factors as the dimensions of the waterway, for example. Thus, the operator need not manually operate the marine vessel, based on limited information about the waterway, and instead can ensure that the marine vessel maintains a path along the optimized path provided by the system.

BRIEF DESCRIPTION OF THE INVENTION

One embodiment of the present invention provides a system for controlling a marine vessel for travel through a waterway. For example, the system may be used to optimize a path for the marine vessel along the waterway, from a first location to a second location. The first location may be, for example, an initial location of the marine vessel (such as the ingress to the waterway), and the second location may be a final location of the marine vessel, such as at a dock or other docking station. The system includes a processor having a memory, which stores at least one operating parameter of the marine vessel, and navigational data of the waterway. ("Operating parameter" refers to an aspect of the marine vessel as relating to its propulsion through water, including, but not limited to, vessel mass, drag and other hydrodynamic aspects, and propulsion power characteristics.) Additionally, the system includes a propulsion system and a directional system on the marine vessel, where the propulsion system and directional system are coupled to the processor and respectively impart a selective propulsion force on the marine vessel at a selective direction based on a respectively received propulsion command and direction command from the processor. (In other words, based on a propulsion command received from the processor, the propulsion system imparts a selective propulsion force on the marine vessel. The direction of the propulsion force is governed by the directional system, based on a direction command received from the processor. "Selective" refers to a particular selected/designated propulsion force or direction, as applicable.) The processor determines an optimal path for the marine vessel through the waterway from the first location to the second location. The processor also determines the propulsion command and the direction command to be transmitted to the propulsion and directional system at a respective incremental location along the optimal path. The optimal path, propulsion command, and direction command are determined so as to optimize a performance characteristic of the marine vessel along the optimal path. The determination of the optimal path, the propulsion command, and the direction command is based on the first location, the second location, the at least one operating parameter, the performance characteristic, and the navigational data. As should be appreciated, "incremental" refers to one of a plurality of successive locations along the optimal path; the processor determines a propulsion command and a direction command at each successive location for optimizing the performance characteristic of the marine vessel along the optimal route. "Performance characteristic" refers to a designated aspect of the marine vessel's travel along the path, such as travel time, fuel or energy efficiency, arrival time at a waypoint (or destination location or other location), or the like.

Another embodiment of the present invention provides a system for controlling a combination of vessels through a waterway. For example, the system may be used to optimize a path for the combination of vessels through the waterway from a first location (e.g., an initial location) to a second location (e.g., a final location). The system includes a processor, and a respective propulsion system and a respective directional system on the vessels, which are coupled to the processor and configured to respectively impart a selective propulsion force on the respective vessel at a selective direction based on a respectively received propulsion command and direction command from the processor. The processor determines a respective optimal path for the vessels through the waterway from the first location to the second location, a respective propulsion command, and a respective direction command to be transmitted to the respective propulsion and respective directional system of the vessels at a respective incremental location along the optimal path, so to optimize a performance characteristic of the vessels along the respective optimal path. The determination of the respective optimal path, the respective propulsion command, and the respective direction command is based on the first location, the second location, at least one respective operating parameter of the vessels, the performance characteristic, and a navigational data of the waterway.

Another embodiment of the present invention provides a method for controlling a marine vessel through a waterway, e.g., for optimizing a path for the marine vessel through the waterway from a first location (e.g., an initial location) to a second location (e.g., a final location). The method includes determining an optimal path for the marine vessel through the waterway from the first location to the second location. Additionally, the method includes determining a propulsion command and a direction command to be transmitted to a respective propulsion and directional system of the marine vessel at a respective incremental location along the optimal path. The optimal path, the propulsion command, and the direction command are determined for optimizing a designated performance characteristic of the marine vessel along the path, and are determined based on the first location, the second location, the performance characteristic, at least one operating parameter of the marine vessel, and navigational data of the waterway.

The term "waterway" refers to any body of water.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, exemplary embodiments of the invention will be described and explained with additional specificity and detail through the use of the accompanying drawings in which:

FIG. 11 illustrates a top schematic view of an exemplary embodiment of a system for controlling a marine vessel, including optimizing a path for the marine vessel through a waterway from a first location to a second location, in accordance with the present invention;

FIG. 12 illustrates a plot of an exemplary embodiment of an activation level of a propulsion system of the marine vessel through the waterway illustrated in FIG. 11;

FIG. 13 illustrates a plot of an exemplary embodiment of an activated direction of a directional system of the marine vessel through the waterway illustrated in FIG. 11;

FIG. 14 illustrates a plot of an exemplary embodiment of an activated direction of a directional system of the marine vessel through the waterway illustrated in FIG. 11;

FIG. 15 illustrates a top schematic view of an exemplary embodiment of a system for optimizing a path for a combination of a marine vessel and a secondary vessel through a waterway from a first location to a second location, in accordance with the present invention;

FIG. 16 illustrates a plot of an exemplary embodiment of a respective activation level of a respective propulsion system of the combination of the marine vessel and the secondary vessel through the waterway illustrated in FIG. 15;

FIG. 17 illustrates a plot of an exemplary embodiment of a respective activated direction of a respective directional system of the combination of the marine vessel and the secondary vessel through the waterway illustrated in FIG. 15;

FIG. 18 illustrates a plot of an exemplary embodiment of a respective activated direction of a respective directional system of the combination of the marine vessel and the secondary vessel through the waterway illustrated in FIG. 15;

DETAILED DESCRIPTION OF THE INVENTION

Figure 1:
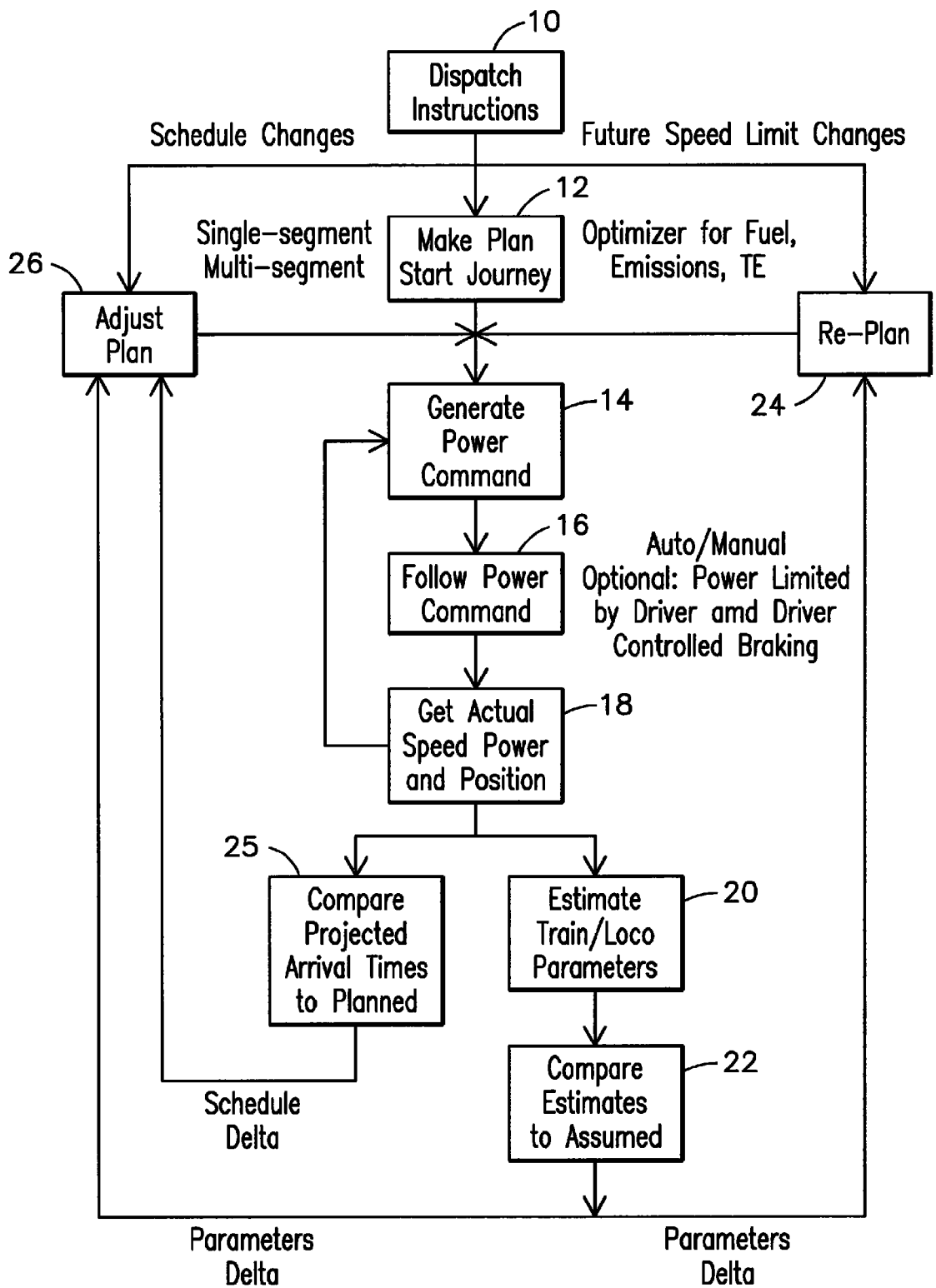
FIG. 1 depicts a flow chart of a method for controlling a marine vessel or other powered system, e.g., for optimizing a trip or other mission of the powered system, according to an embodiment of the present invention.

Reference will now be made in detail to the embodiments consistent with the invention, examples of which are illustrated in the accompanying drawings. Wherever possible, the same reference numerals used throughout the drawings refer to the same or like parts.

The present invention solves the problems in the art by providing a system, method, and computer implemented method for determining and implementing a propulsion strategy or other mission plan of a train, marine vessel, other vehicle, or other powered system, including determining an approach to monitor and control a powered system's operations to improve certain objective operating criteria parameter requirements while satisfying schedule and speed constraints, for example. The present invention is also operable in distributed power operations, e.g., a situation where two or more powered systems are controlled in concert for carrying out a designated mission. Persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention. Although specific embodiments of the present invention relate to a system, method, and computer implemented method for controlling a marine vessel through a waterway, which includes determining and implementing an optimized path of the marine vessel through the waterway, the present invention may be applicable to any powered system carrying out a mission.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

Broadly speaking, various embodiments of the invention provide a method, system, and program for controlling a marine vessel through a waterway, including determining and implementing an optimized path for the marine vessel through the waterway, and further including determining an approach to monitor and control a marine vessel's operations to improve certain objective operating criteria parameter requirements while satisfying schedule and speed constraints. To facilitate an understanding of the present invention, it is described hereinafter with reference to specific implementations thereof. The invention is described in the general context of computer-executable instructions, such as program modules, being executed by a computer. Generally, program modules include routines, programs, objects, components, data structures, etc., that perform particular tasks or implement particular abstract data types. For example, the software programs that underlie the invention can be coded in different languages, for use with different platforms. In the description that follows, examples of the invention are described in the context of a web portal that employs a web browser. It will be appreciated, however, that the principles that underlie the invention can be implemented with other types of computer software technologies as well. In addition to a marine vessel, including a combination of marine vessels organized as a consist (i.e., a designated group of marine vessels), the invention is generally applicable to all powered systems.

Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices. These local and remote computing environments may be contained entirely within the marine vessel or other powered system, or adjacent vehicles in a consist, or off-board in wayside or central offices where wireless communication is used.

Throughout this document the term "consist" is used. As used herein, a consist may be described as having one or more marine vessels or other powered vehicles in succession, connected together so as to provide motoring (propulsion) and/or braking (deceleration) capability. The powered vehicles may be connected together where no non-powered vehicles are in between the powered vehicles. The series of linked or connected vehicles (referred to herein as a "vehicle train," and including the possibility where the vehicle train comprises a single vehicle) can have more than one consist in its composition. Specifically, there can be a lead consist, and more than one remote consists, such as midway in the line of vehicles and another remote consist at the end of the vehicle train. Each consist may have a first powered vehicle and trail powered vehicle(s). Though a consist is usually viewed as successive powered vehicles, those skilled in the art will readily recognize that a consist group of powered vehicles may also be recognized as a consist even when at least a non-powered vehicle separates the powered vehicles, such as when the consist is configured for distributed power operation, wherein throttle and braking commands are relayed from the lead powered vehicle to the remote trails by a radio link or physical cable. Towards this end, the term "consist" should not be considered a limiting factor when discussing multiple powered vehicles within the same vehicle train. The term "consist" is applicable to any powered vehicle or other powered system.

Referring now to the drawings, embodiments of the present invention will be described. The invention can be implemented in numerous ways, including as a system (including a computer processing system), a method (including a computerized method), an apparatus, a computer readable medium, a computer program product, a graphical user interface, including a web portal, or a data structure tangibly fixed in a computer readable memory. Several embodiments of the invention are discussed below.

FIG. 1 is a flow chart of a method for planning a trip or other mission for a powered system (e.g., marine vessel or other powered vehicle), according to an exemplary embodiment of the present invention. As illustrated, instructions are input specific to planning a trip either on board or from a remote location, such as a dispatch center 10. Such input information includes, but is not limited to, vehicle position, consist description (such as vehicle models), vehicle power description, performance of a vehicle propulsion system (e.g., in the case of a marine vessel, propellers), consumption of engine fuel as a function of output power, cooling characteristics, the intended trip route, the vehicle train (e.g., series of linked marine vessels and possibly non-powered boats) represented by vehicle makeup and loading together with effective drag coefficients, trip desired parameters including, but not limited to, start time and location, end location, desired travel time, crew (user and/or operator) identification, crew shift expiration time, and route.

This data may be provided to the vehicle 42 in a number of ways, such as, but not limited to, an operator manually entering this data into the vehicle 42 via an onboard display, inserting a memory device such as a "hard card" and/or USB drive containing the data into a receptacle aboard the vehicle, and transmitting the information via wireless communication from a central or wayside location 41, such as a track (or other route) signaling device and/or a wayside device, to the vehicle 42. Vehicle 42 and vehicle train 31 load characteristics (e.g., drag) may also change over the route (e.g., with altitude, ambient temperature, and condition of the route and vehicles), and the plan may be updated to reflect such changes as needed by any of the methods discussed above and/or by real-time autonomous collection of vehicle/vehicle train conditions. This includes, for example, changes in vehicle or vehicle train characteristics detected by monitoring equipment on or off board the vehicle(s) 42.

The track (or other route) signal system determines the allowable speed of the vehicle train. There are many types of route signal systems and operating rules associated with each of the signals. For example, some signals have a single light (on/off), some signals have a single lens with multiple colors, and some signals have multiple lights and colors. These signals can indicate that the route is clear and the train may proceed at max allowable speed. They can also indicate a reduced speed or stop is required. This reduced speed may need to be achieved immediately, or at a certain location (e.g., prior to the next signal or crossing). In a marine context, route signals or wayside devices may include signaling buoys, navigational beacons (e.g., channel markers), lighthouses, or the like.

The signal status is communicated to the vehicle train (or single marine vessel or other powered vehicle) and/or operator through various means. In the case of a rail vehicle, some systems have circuits in the track and inductive pick-up coils on the rail cars. Other systems have wireless communications systems. Signal systems can also require the operator to visually inspect the signal and take the appropriate actions.

The signaling system may interface with the on-board signal system and adjust the vehicle speed according to the inputs and the appropriate operating rules. For signal systems that require the operator to visually inspect the signal status, the operator screen will present the appropriate signal options for the operator to enter based on the vehicle's location. The type of signal systems and operating rules, as a function of location, may be stored in an onboard database 63.

Based on the specification data input into the present invention, an optimal plan which minimizes fuel use and/or emissions produced subject to speed limit constraints along the route with desired start and end times is computed to produce a trip profile 12 (more generally, a mission plan or profile). The profile contains the optimal speed and power (throttle) settings the vehicle train (or individual marine vessel or other powered vehicle) is to follow, expressed as a function of distance and/or time, and such vehicle/vehicle train operating limits, including but not limited to, the maximum throttle power and brake settings, and speed limits as a function of location, and the expected fuel used and emissions generated. In an exemplary embodiment, the value for the throttle setting is selected to obtain throttle change decisions about once every 10 to 30 seconds. Those skilled in the art will readily recognize that the throttle change decisions may occur at a longer or shorter duration, if needed and/or desired to follow an optimal speed profile. In a broader sense, it should be evident to ones skilled in the art that the profile provides power settings for the vehicle train, either at the vehicle train level, consist level, and/or individual vehicle level. Power comprises braking power, motoring power, and, in the case of some vehicles, airbrake power. In another embodiment, instead of operating at discrete throttle power settings, the present invention is able to select a continuous power setting determined as optimal for the profile selected. Thus, for example, if an optimal profile specifies a throttle setting of 6.8, instead of operating at throttle setting 7, the marine vessel or other vehicle 42 can operate at 6.8. Allowing such intermediate power settings may bring additional efficiency benefits as described below.

The procedure used to compute the optimal profile can be any number of methods for computing a power sequence that drives the vehicle train 31 to minimize fuel and/or emissions subject to marine vessel (or other powered vehicle) operating and schedule constraints, as summarized below. In some cases the required optimal profile may be close enough to one previously determined, owing to the similarity of the vehicle train configuration, route and environmental conditions. In these cases it may be sufficient to look up the driving trajectory within a database 63 and attempt to follow it. When no previously computed plan is suitable, methods to compute a new one include, but are not limited to, direct calculation of the optimal profile using differential equation models which approximate the vehicle train physics of motion. The setup involves selection of a quantitative objective function, commonly a weighted sum (integral) of model variables that correspond to rate of fuel consumption and emissions generation plus a term to penalize excessive throttle variation.

An optimal control formulation is set up to minimize the quantitative objective function subject to constraints including but not limited to, speed limits and minimum and maximum power (throttle) settings. Depending on planning objectives at any time, the problem may be implemented flexibly to minimize fuel subject to constraints on emissions and speed limits, or to minimize emissions, subject to constraints on fuel use and arrival time. It is also possible to implement, for example, a goal to minimize the total travel time without constraints on total emissions or fuel use where such relaxation of constraints would be permitted or required for the mission.

Mathematically, the problem to be solved may be stated more precisely. The basic physics are expressed by:

$$\frac{dx}{dt} = v; \ x(0) = 0.0; \ x(T_f) = D$$

$$\frac{dv}{dt} = T_e(u, v) - G_a(x) - R(v); \ v(0) = 0.0; \ v(T_f) = 0.0$$

where x is the position of the vehicle train, v its velocity and t is time (in miles, miles per hour, and minutes or hours as appropriate) and u is the notch (throttle) command input. Further, D denotes the distance to be traveled, $T_f$ the desired arrival time at distance D along the track (or other route), $T_e$ is the tractive effort produced by the vehicle consist, $G_a$ is the gravitational drag which depends on the vehicle train length, vehicle train makeup, and terrain on which the vehicle train is located, and R is the net speed dependent drag of the vehicle consist and vehicle train combination. The initial and final speeds can also be specified, but without loss of generality are taken to be zero here (e.g., vehicle train stopped at beginning and end). Finally, the model is readily modified to include other important dynamics such the lag between a change in throttle, u, and the resulting tractive effort (propulsion) or braking. Using this model, an optimal control formulation is set up to minimize the quantitative objective function subject to constraints including but not limited to, speed limits and minimum and maximum power (throttle) settings. Depending on planning objectives at any time, the problem may be setup flexibly to minimize fuel subject to constraints on emissions and speed limits, or to minimize emissions, subject to constraints on fuel use and arrival time.

It is also possible to implement, for example, a goal to minimize the total travel time without constraints on total emissions or fuel use where such relaxation of constraints would be permitted or required for the mission. All these performance measures can be expressed as a linear combination of any of the following:

$$\min_{u(t)} \int_0^{T_f} F(u(t)) dt \quad \text{-Minimize total fuel consumption.} \tag{1}$$

$$\min_{u(t)} T_f \quad \text{-Minimize Travel Time.} \tag{2}$$

$$\min_{u_i} \sum_{i=2}^{n_d} (u_i - u_{i-1})^2 \quad \text{-Minimize notch/} \tag{3}$$

throttle jockeying(piecewise constant input).

$$\min_{u(t)} \int_0^{T_f} (du/dt)^2 dt \quad \text{-Minimize} \tag{4}$$

notch/throttle jockeying(continuous input).

It is possible to replace the fuel term F in (1) with a term corresponding to emissions production. For example, for emissions $$\min_{u(t)} \int_0^{T_f} E(u(t))\,dt \quad \text{-Minimize total emissions production.}$$

In this equation E is the quantity of emissions in gm/hphr for each of the notch or other throttle settings. In addition, a minimization could be done based on a weighted total of fuel and emissions.

A commonly used and representative objective function is thus:

$$\min_{u(t)} \alpha_1 \int_0^{T_f} F(u(t))\,dt + \alpha_3 T_f + \alpha_2 \int_0^{T_f} (du/dt)^2\,dt \quad \text{(OP)}$$

The coefficients of the linear combination will depend on the importance (weight) given for each of the terms. Note that in equation (OP), u(t) is the optimizing variable which is the continuous throttle position. If discrete throttle is required, e.g., for older locomotive and certain marine vessels and other powered vehicles, the solution to equation (OP) would be discretized, which may result in less fuel saving. Finding a minimum time solution ($\alpha 1$ and $\alpha 2$ set to zero) is used to find a lower bound for the achievable travel time ($T_f = T_{fmin}$) In this case, both u(t) and $T_f$ are optimizing variables. In one embodiment, equation (OP) is solved for various values of $T_f$ with $\alpha 3$ set to zero. For those familiar with solutions to such optimal problems, it may be necessary to adjoin constraints, e.g. the speed limits along the path:

$$0 \leq v \leq SL(x)$$

or when using minimum time as the objective, that an end point constraint must hold, e.g., total fuel consumed must be less than what is in the tank, e.g., via:

$$0 < \int_0^{T_f} F(u(t))\,dt \leq W_F$$

Here, $W_F$ is the fuel remaining in the tank at Tf. Those skilled in the art will readily recognize that equation (OP) can be in other forms as well and that what is presented above is an exemplary equation for use in the present invention.

Reference to emissions in the context of the present invention is actually directed towards cumulative emissions produced in the form of oxides of nitrogen (NOx), unburned hydrocarbons, and particulates. For example, in the context of locomotives, by design, every locomotive must be compliant to EPA standards for brake-specific emissions, and thus when emissions are optimized in the present invention this would be mission total emissions on which there is no specification today. (This may also be applicable to other powered vehicles.) At all times, operations would be compliant with federal EPA mandates. If a key objective during a trip mission is to reduce emissions, the optimal control formulation, equation (OP), would be amended to consider this trip objective. A key flexibility in the optimization setup is that any or all of the trip objectives can vary by geographic region or mission. For example, for a high priority train, minimum time may be the only objective on one route because it is high priority traffic. In another example emission output could vary from state to state along the planned train route.

To solve the resulting optimization problem, in an exemplary embodiment the present invention transcribes a dynamic optimal control problem in the time domain to an equivalent static mathematical programming problem with N decision variables, where the number 'N' depends on the frequency at which throttle and braking adjustments are made and the duration of the trip. For typical problems, this N can be in the thousands. For example, again referring to rail vehicles as an example, suppose a train is traveling a 172-mile (276.8 kilometers) stretch of track in the southwest United States. Utilizing the present invention, an exemplary 7.6% saving in fuel used may be realized when comparing a trip determined and followed using the present invention versus an actual driver throttle/speed history where the trip was determined by an operator. The improved savings is realized because the optimization realized by using the present invention produces a driving strategy with both less drag loss and little or no braking loss compared to the trip plan of the operator.

Figure 2:
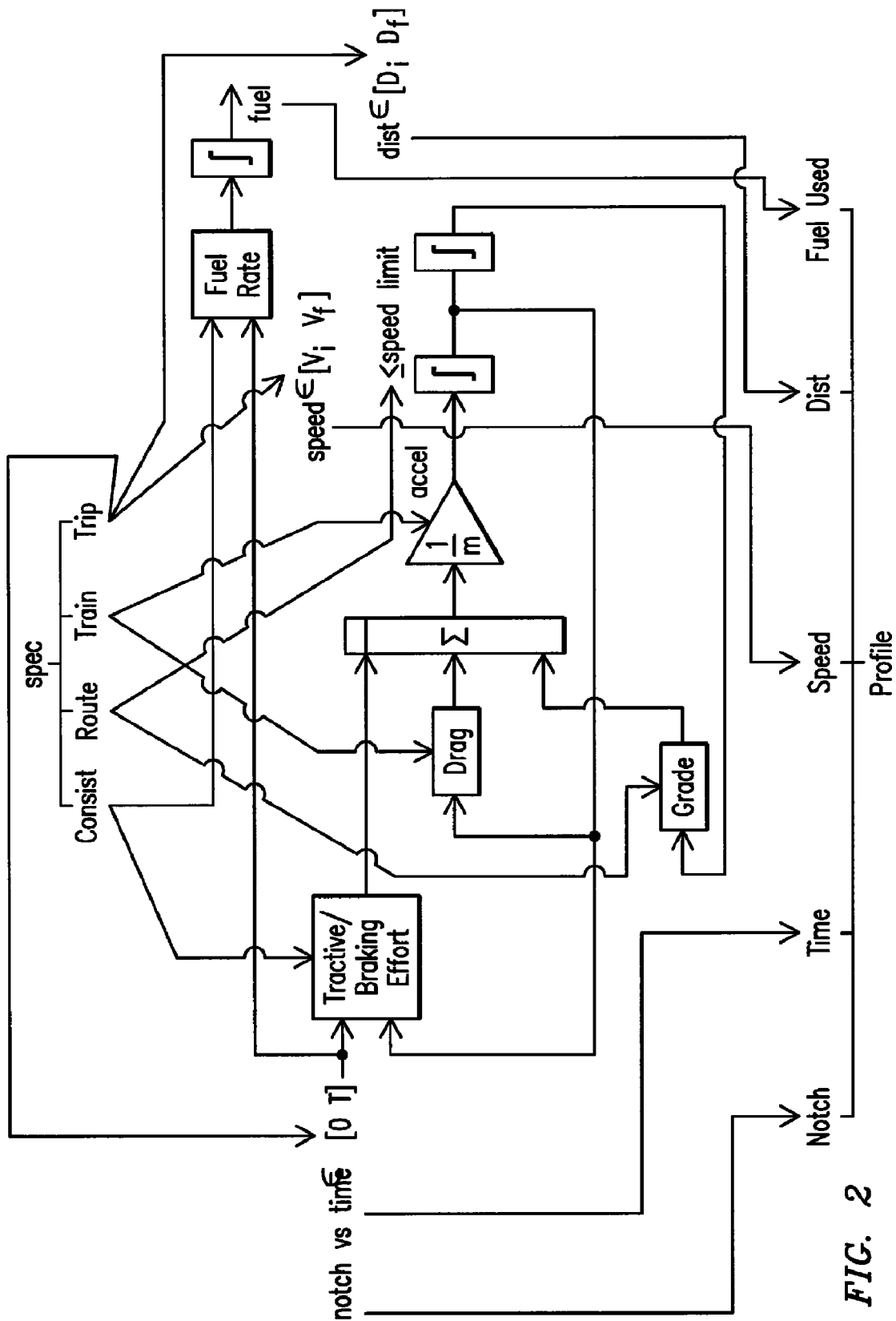
FIG. 2 depicts a simplified model of a train, marine vessel, or other powered system that may be employed as part of the method/system.

To make the optimization described above computationally tractable, a simplified model of the vehicle train may be employed, such as illustrated in FIG. 2 and the equations discussed above. One possible refinement to the optimal profile is produced by driving a more detailed model with the optimal power sequence generated, to test if other thermal, electrical and mechanical constraints are violated. This leads to a modified profile with speed versus distance that is closest to a run that can be achieved without harming vehicle or vehicle train equipment, i.e., satisfying additional implied constraints such thermal and electrical limits on the vehicles and inter-vehicle forces in the vehicle train.

Referring back to FIG. 1, once the trip is started 12, power commands are generated 14 to put the plan in motion. Depending on the operational set-up of the present invention, one command is for the marine vessel or other powered vehicle to follow the optimized power command 16 so as to achieve the optimal speed. The present invention obtains actual speed and power information from the vehicle consist of the vehicle train 18. Owing to the inevitable approximations in the models used for the optimization, a closed-loop calculation of corrections to optimized power is obtained to track the desired optimal speed. Such corrections of vehicle train operating limits can be made automatically or by the operator, who always has ultimate control of the vehicle train.

In some cases, the model used in the optimization may differ significantly from the actual vehicle train. This can occur for many reasons, including but not limited to, extra cargo pickups or setouts, vehicles that fail in route, and errors in the initial database 63 or data entry by the operator. For these reasons a monitoring system is in place that uses real-time vehicle train data to estimate vehicle and/or vehicle train parameters in real time 20. The estimated parameters are then compared to the assumed parameters used when the trip was initially created 22. Based on any differences in the assumed and estimated values, the trip may be re-planned 24, should large enough savings accrue from a new plan.

Other reasons a trip may be re-planned include directives from a remote location, such as dispatch and/or the operator requesting a change in objectives to be consistent with more global movement planning objectives. Additional global movement planning objectives may include, but are not limited to, other vehicle train schedules, allowing exhaust to dissipate from a tunnel, maintenance operations, etc. Another reason may be due to an onboard failure of a component. Strategies for re-planning may be grouped into incremental and major adjustments depending on the severity of the disruption, as discussed in more detail below. In general, a "new" plan must be derived from a solution to the optimization problem equation (OP) described above, but frequently faster approximate solutions can be found, as described herein.

Figure 4:
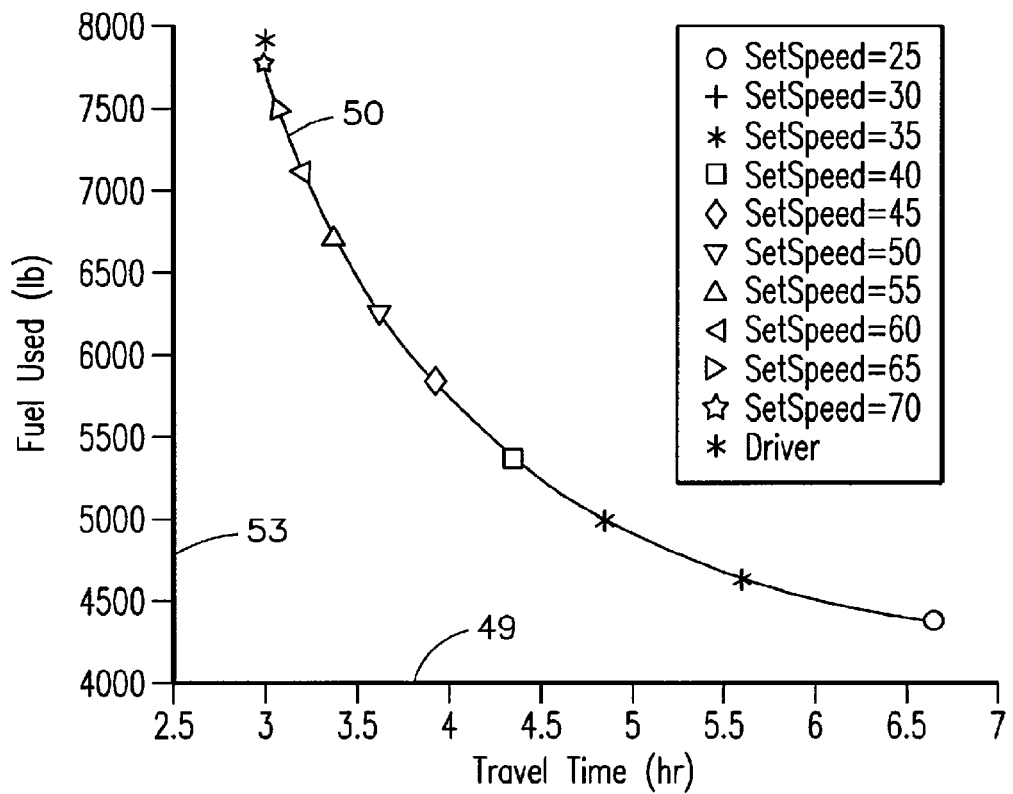
FIG. 4 depicts an exemplary embodiment of a fuel-use/travel time curve.

In operation, the marine vessel or other powered vehicle 42 will continuously monitor system efficiency and continuously update the trip plan based on the actual efficiency measured, whenever such an update would improve trip performance. Re-planning computations may be carried out entirely within the vehicle(s) or fully or partially moved to a remote location, such as dispatch or wayside processing facilities where wireless technology is used to communicate the plans to the vehicle 42. The present invention may also generate efficiency trends that can be used to develop vehicle fleet data regarding efficiency transfer functions. The fleet-wide data may be used when determining the initial trip plan, and may be used for network-wide optimization tradeoff when considering locations of a plurality of vehicle trains. For example, the travel-time fuel use tradeoff curve as illustrated in FIG. 4 reflects a capability of a vehicle train on a particular route at a current time, updated from ensemble averages collected for many similar trains on the same route. Thus, a central dispatch facility collecting curves like FIG. 4 from many vehicles could use that information to better coordinate overall vehicle movements to achieve a system-wide advantage in fuel use or throughput.

Many events in daily operations can lead to a need to generate or modify a currently executing plan, where it desired to keep the same trip objectives, for example when a vehicle train is not on schedule for planned meet or pass with another train and it needs to make up time. Using the actual speed, power, and location of the vehicle, a comparison is made between a planned arrival time and the currently estimated (predicted) arrival time 25. Based on a difference in the times, as well as the difference in parameters (detected or changed by dispatch or the operator), the plan is adjusted 26. This adjustment may be made automatically according to a vehicle owner's desire for how such departures from plan should be handled, or alternatives may be manually proposed for the on-board operator and dispatcher to jointly decide the best way to get back on plan. Whenever a plan is updated but where the original objectives (such as but not limited to arrival time) remain the same, additional changes may be factored in concurrently, e.g., new future speed limit changes, which could affect the feasibility of ever recovering the original plan. In such instances, if the original trip plan cannot be maintained, or in other words the vehicle train is unable to meet the original trip plan objectives, as discussed herein other trip plan(s) may be presented to the operator and/or remote facility, or dispatch.

A re-plan may also be made when it is desired to change the original objectives. Such re-planning can be done at either fixed preplanned times, manually at the discretion of the operator or dispatcher, or autonomously when predefined limits, such as vehicle train operating limits, are exceeded. For example, if the current plan execution is running late by more than a specified threshold, such as thirty minutes, the system of the present invention can re-plan the trip to accommodate the delay at the expense of increased fuel use, as described above, or to alert the operator and dispatcher how much of the time can be made up at all (e.g., what minimum time to go or the maximum fuel that can be saved within a time constraint). Other triggers for re-plan can also be envisioned based on fuel consumed or the health of the vehicle and/or consist, including but not limited time of arrival, loss of horsepower due to equipment failure and/or equipment temporary malfunction (such as operating too hot or too cold), and/or detection of gross setup errors, such as in the assumed vehicle train load. That is, if the change reflects impairment in the vehicle performance for the current trip, these may be factored into the models and/or equations used in the optimization.

Changes in plan objectives can also arise from a need to coordinate events where the plan for one vehicle train compromises the ability of another vehicle train to meet objectives and arbitration at a different level, e.g., the dispatch office is required. For example, in the case of a rail vehicle, the coordination of meets and passes may be further optimized through train-to-train communications. Thus, as an example, if a train knows that it is behind schedule in reaching a location for a meet and/or pass, communications from the other train can notify the late train (and/or dispatch). The operator can then enter information pertaining to being late into the system of the present invention, which recalculates the train's trip plan. The system of the present invention can also be used at a high level, or network-level, to allow a dispatch to determine which train should slow down or speed up should a scheduled meet and/or pass time constraint may not be met. As discussed herein, this is accomplished by trains transmitting data to the dispatch to prioritize how each train should change its planning objective. A choice could be based on either schedule or fuel saving benefits, depending on the situation.

Figure 5:
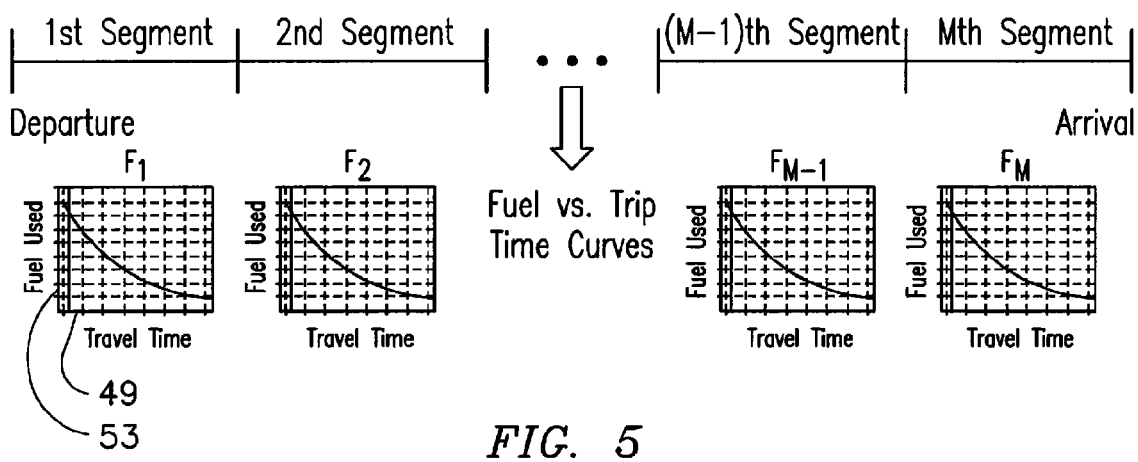
FIG. 5 depicts an exemplary embodiment of segmentation decomposition for trip planning.

For any of the manually or automatically initiated re-plans, the system of the present invention may present more than one trip plan to the operator. In an exemplary embodiment, the present invention will present different profiles to the operator, allowing the operator to select the arrival time and understand the corresponding fuel and/or emission impact. Such information can also be provided to the dispatch for similar consideration, either as a simple list of alternatives or as a plurality of tradeoff curves such as illustrated in FIG. 5.

Embodiments of the present invention have the ability to learn and adapt to key changes in the vehicle train and power consist which can be incorporated either in the current plan and/or in future plans. For example, one of the triggers discussed above is loss of horsepower. When building up horsepower over time, either after a loss of horsepower or when beginning a trip, transition logic is utilized to determine when desired horsepower is achieved. This information can be saved in the vehicle database 61 for use in optimizing either future trips or the current trip should loss of horsepower occur again.

Figure 3:
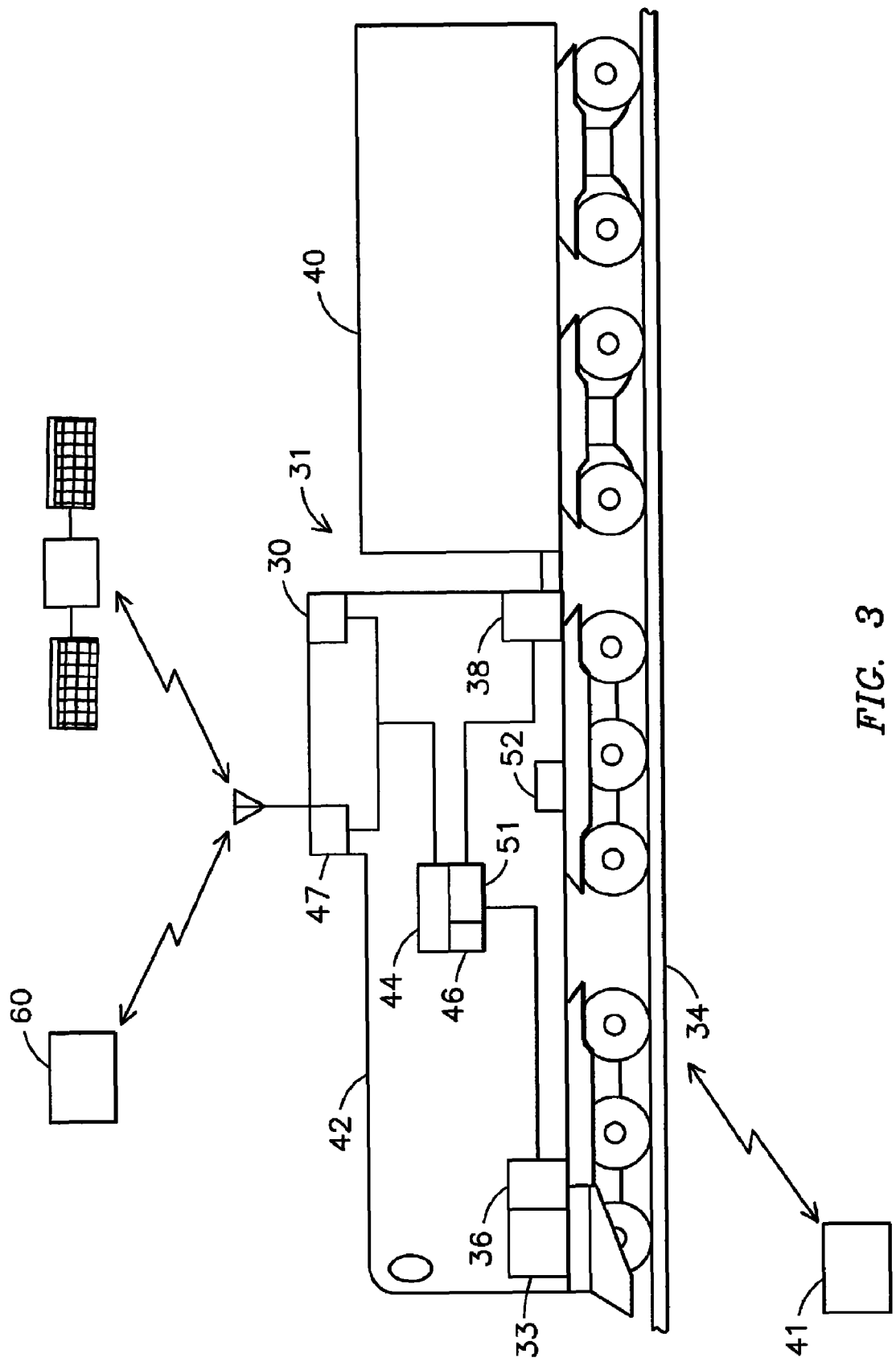
FIG. 3 is a schematic diagram of various elements in a system for controlling a marine vessel or other powered system, e.g., for optimizing a trip or other mission of the powered system, according to an embodiment of the present invention.

FIG. 3 depicts various elements that may be part of a trip (or other mission) optimizer system, according to an exemplary embodiment of the present invention. A locator element 30 to determine a location of the vehicle train 31 is provided. The locator element 30 can be a GPS sensor, or a system of sensors, that determines a location of the vehicle train 31. Examples of such other systems may include, but are not limited to, wayside devices, such as radio frequency automatic equipment identification (RF AEI) tags, dispatch, and/or video determination. Another system may include the tachometer(s) aboard a vehicle and distance calculations from a reference point. As discussed previously, a wireless communication system 47 may also be provided to allow for communications between trains and/or with a remote location, such as dispatch. Information about travel locations may also be transferred from other vehicle trains.

A route characterization element 33 to provide information about a route, principally grade and elevation and curvature information, is also provided. The route characterization element 33 may include an on-board route integrity database 36.

Sensors 38 are used to measure a tractive effort 40 being hauled by the vehicle consist 42, throttle setting of the vehicle consist 42, vehicle consist 42 configuration information, speed of the vehicle consist 42, individual marine vessel or other vehicle configuration, individual marine vessel or other powered vehicle capability, etc. In an exemplary embodiment the vehicle consist 42 configuration information may be loaded without the use of a sensor 38, but is input in another manner as discussed above. Furthermore, the health of the vehicles in the consist may also be considered. For example, if one vehicle in the consist is unable to operate above a particular throttle setting, this information is used when optimizing the trip plan.

Information from the locator element may also be used to determine an appropriate arrival time of the vehicle train 31. For example, if there is a vehicle train 31 moving along a route 34 towards a destination and no vehicle train is following behind it, and the vehicle train has no fixed arrival deadline to adhere to, the locator element, including but not limited to RF AEI tags, dispatch, and/or video determination, may be used to gage the exact location of the vehicle train 31. Furthermore, inputs from these signaling systems may be used to adjust the vehicle train speed. Using the on-board route database, discussed below, and the locator element, such as GPS, the system of the present invention can adjust the operator interface to reflect the signaling system state at the given vehicle location. In a situation where signal states would indicate restrictive speeds ahead, the planner may elect to slow the train to conserve fuel consumption.

Information from the locator element 30 may also be used to change planning objectives as a function of distance to destination. For example, owing to inevitable uncertainties about congestion along the route, "faster" time objectives on the early part of a route may be employed as a hedge against delays that statistically occur later. If it happens on a particular trip that delays do not occur, the objectives on a latter part of the journey can be modified to exploit the built-in slack time that was banked earlier, and thereby recover some fuel efficiency. A similar strategy could be invoked with respect to emissions restrictive objectives, e.g., approaching an urban area.

As an example of the hedging strategy, in the case of a rail vehicle, if a trip is planned from New York to Chicago, the system may have an option to operate the train slower at either the beginning of the trip or at the middle of the trip or at the end of the trip. The system of the present invention would optimize the trip plan to allow for slower operation at the end of the trip since unknown constraints, such as but not limited to weather conditions, route maintenance, etc., may develop and become known during the trip. As another consideration, if traditionally congested areas are known, the plan is developed with an option to have more flexibility around these traditionally congested regions. Therefore, the present invention may also consider weighting/penalty as a function of time/distance into the future and/or based on known/past experience. Those skilled in the art will readily recognize that such planning and re-planning to take into consideration weather conditions, route conditions, other trains on the route, etc., may be taken into consideration at any time during the trip wherein the trip plan is adjust accordingly.

FIG. 3 further discloses other elements that may be part of the trip (or other mission) optimizer system of the present invention. A processor 44 is provided that is operable to receive information from the locator element 30, route characterizing element 33, and sensors 38. An algorithm 46 (e.g., implemented as a set of computer program/instructions) operates within the processor 44. The algorithm 46 is used to compute an optimized trip (or other mission) plan based on parameters involving the marine vessel or other powered vehicle 42, vehicle train 31, route 34, and objectives of the mission as described above. In an exemplary embodiment, the trip plan is established based on models for vehicle train behavior as the vehicle train 31 moves along the route 34 as a solution of non-linear differential equations derived from physics with simplifying assumptions that are provided in the algorithm. The algorithm 46 has access to the information from the locator element 30, route characterizing element 33, and/or sensors 38 to create a trip plan minimizing fuel consumption of a vehicle consist 42, minimizing emissions of a vehicle consist 42, establishing a desired trip time, and/or ensuring proper crew operating time aboard the vehicle consist 42. In an exemplary embodiment, a driver or operator, and/or controller element, 51 is also provided. As discussed herein the controller element 51 is used for controlling the vehicle train as it follows the trip plan. In an exemplary embodiment discussed further herein, the controller element 51 makes vehicle train operating decisions autonomously. In another exemplary embodiment the operator may be involved with directing the vehicle train to follow the trip plan.

A feature of an exemplary embodiment of the trip optimizer system is the ability to initially create and quickly modify "on the fly" any plan that is being executed. This includes creating the initial plan when a long distance is involved, owing to the complexity of the plan optimization algorithm. When a total length of a trip profile exceeds a given distance, an algorithm 46 may be used to segment the mission, wherein the mission may be divided by waypoints. Though only a single algorithm 46 is discussed, more than one algorithm may be used (or the same algorithm may be executed a plurality of times) wherein the algorithms may be connected together. The waypoint may include natural locations where the vehicle train 31 stops, for example, in the case of rail vehicles, sidings where a meet with opposing traffic (or pass with a train behind the current train) is scheduled to occur on a single-track rail, or at yard sidings or industry where cars are to be picked up and set out, and locations of planned work. At such waypoints, the vehicle train 31 may be required to be at the location at a scheduled time and be stopped or moving with speed in a specified range. The time duration from arrival to departure at waypoints is called "dwell time."

In an exemplary embodiment, the trip optimizer system of the present invention breaks down a longer trip into smaller segments in a special systematic way. Each segment can be somewhat arbitrary in length, but is typically picked at a natural location such as a stop or significant speed restriction, or at key mileposts that define junctions with other routes. Given a partition, or segment, selected in this way, a driving profile is created for each segment of route as a function of travel time taken as an independent variable, such as shown in FIG. 4. The fuel used/travel-time tradeoff associated with each segment can be computed prior to the vehicle train 31 reaching that segment of route. A total trip plan can be created from the driving profiles created for each segment. The system distributes travel time amongst all the segments of the trip in an optimal way so that the total trip time required is satisfied and total fuel consumed over all the segments is as small as possible. An exemplary 3-segment trip is disclosed in FIG. 6 and discussed below. Those skilled in the art will recognize however, through segments are discussed, the trip plan may comprise a single segment representing the complete trip.

FIG. 4 depicts an exemplary embodiment of a fuel-use/travel time curve 50. As mentioned previously, such a curve 50 is created when calculating an optimal trip profile for various travel times for each segment. That is, for a given travel time 51, fuel used 52 is the result of a detailed driving profile computed as described above. Once travel times for each segment are allocated, a power/speed plan is determined for each segment from the previously computed solutions. If there are any waypoint constraints on speed between the segments, such as, but not limited to, a change in a speed limit, they are matched up during creation of the optimal trip profile. If speed restrictions change in only a single segment, the fuel use/travel-time curve 50 has to be re-computed for only the segment changed. This reduces time for having to re-calculate more parts, or segments, of the trip. If the consist or vehicle train changes significantly along the route, e.g., from loss of a powered vehicle or pickup or set-out of cars (non-powered vehicles), then driving profiles for all subsequent segments must be recomputed, thereby creating new instances of the curve 50. These new curves 50 would then be used along with new schedule objectives to plan the remaining trip.

Once a trip plan is created as discussed above, a trajectory of speed and power versus distance is used to reach a destination with minimum fuel use and/or emissions at the required trip time. There are several ways in which to execute the trip plan. As provided below in more detail, in one exemplary embodiment, when in an operator "coaching mode," information is displayed to the operator for the operator to follow to achieve the required power and speed determined according to the optimal trip plan. In this mode, the operating information includes suggested operating conditions that the operator should use. In another exemplary embodiment, acceleration and maintaining a constant speed are autonomously performed. However, when the vehicle train 31 must be slowed, the operator is responsible for applying a braking system 52. In another exemplary embodiment, commands for powering and braking are provided as required to follow the desired speed-distance path.

Feedback control strategies are used to provide corrections to the power control sequence in the profile to correct for events such as, but not limited to, vehicle train load variations caused by fluctuating head winds and/or tail winds. Another such error may be caused by an error in vehicle train parameters, such as, but not limited to, vehicle train mass and/or drag, when compared to assumptions in the optimized trip plan. A third type of error may occur with information contained in the route database 36. Another possible error may involve un-modeled performance differences due to the marine vessel (or other powered vehicle) engine, traction motor thermal duration, and/or other factors. Feedback control strategies compare the actual speed as a function of position to the speed in the desired optimal profile. Based on this difference, a correction to the optimal power profile is added to drive the actual velocity toward the optimal profile. To ensure stable regulation, a compensation algorithm may be provided which filters the feedback speeds into power corrections so that closed-performance stability is ensured. Compensation may include standard dynamic compensation as used by those skilled in the art of control system design to meet performance objectives.

The trip optimizer system provides the simplest and therefore fastest means to accommodate changes in trip objectives, which is the rule, rather than the exception in certain vehicle system operations. In an exemplary embodiment, to determine the fuel-optimal trip from point "A" to point "B" where there are stops along the way, and for updating the trip for the remainder of the trip once the trip has begun, a sub-optimal decomposition method is usable for finding an optimal trip profile. Using modeling methods, the computation method can find the trip plan with specified travel time and initial and final speeds, so as to satisfy all the speed limits and vehicle capability constraints when there are stops. Though the following discussion is directed towards optimizing fuel use, it can also be applied to optimize other factors, such as, but not limited to, emissions, schedule, crew comfort, and load impact. The method may be used at the outset in developing a trip plan, and more importantly to adapting to changes in objectives after initiating a trip.

Figure 6:
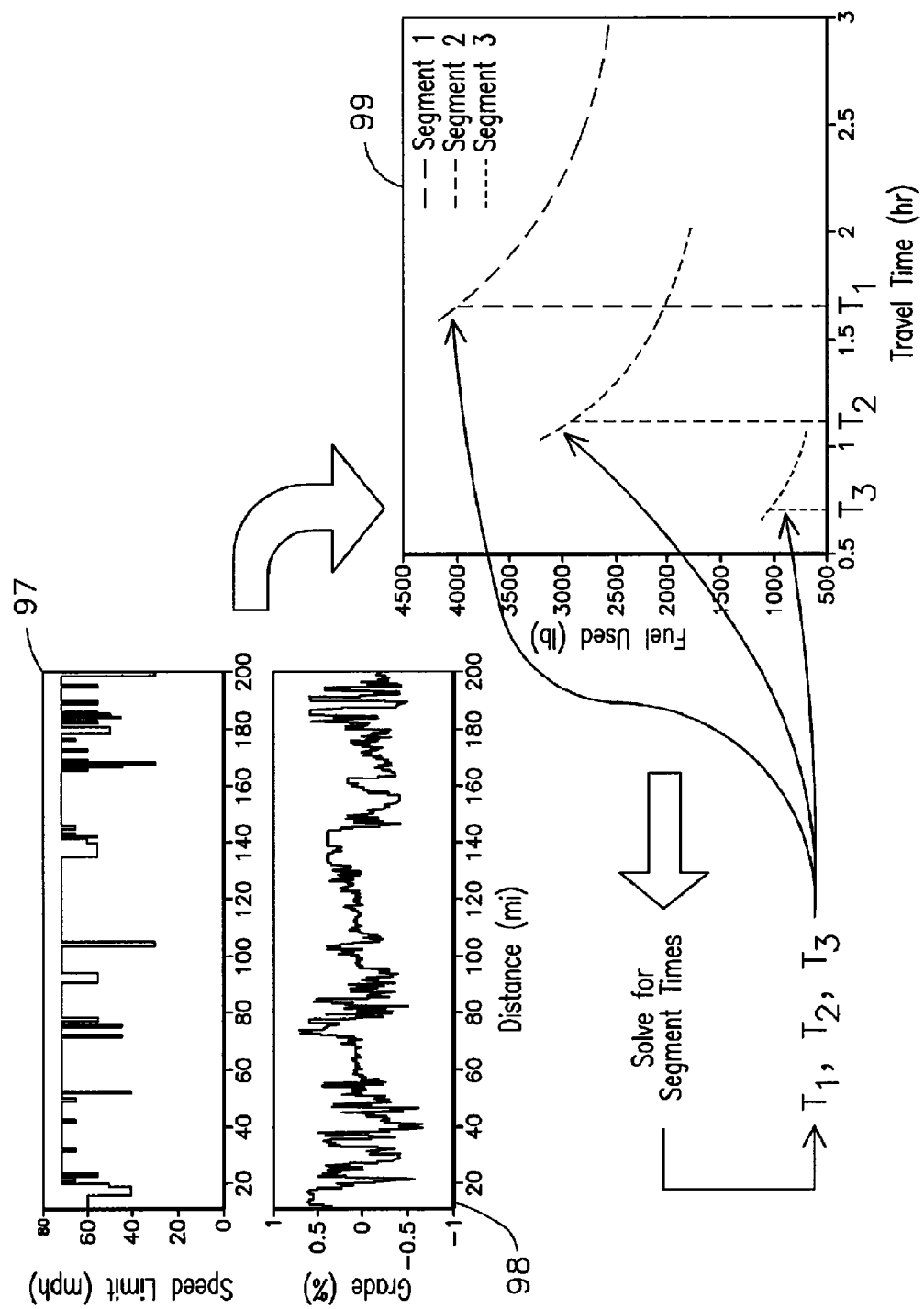
FIG. 6 depicts an exemplary embodiment of a segmentation example.

As discussed herein, embodiments of the present invention may employ a setup as illustrated in the flow chart depicted in FIG. 5, and as an exemplary 3-segment example depicted in detail in FIG. 6. As illustrated, the trip may be broken into two or more segments, T1, T2, and T3. (As noted above, it is possible to consider the trip as a single segment.) As discussed herein, the segment boundaries may not result in equal segments. Instead, the segments may use natural or mission specific boundaries. Optimal trip plans are pre-computed for each segment. If fuel use versus trip time is the trip object to be met, fuel versus trip time curves are built for each segment. As discussed herein, the curves may be based on other factors, wherein the factors are objectives to be met with a trip plan. When trip time is the parameter being determined, trip time for each segment is computed while satisfying the overall trip time constraints. FIG. 6 illustrates speed limits 97 for an exemplary 3-segment 200-mile (321.9 kilometers) trip. Further illustrated are grade changes 98 over the 200-mile (321.9 kilometers) trip. A combined chart 99 illustrating curves for each segment of the trip of fuel used over the travel time is also shown.

Using the optimal control setup described previously and the computation methods described herein, the trip optimizer system can generate the trip plan with specified travel time and initial and final speeds, so as to satisfy all the speed limits and vehicle capability constraints when there are stops. Though the following detailed discussion is directed towards optimizing fuel use, it can also be applied to optimize other factors as discussed herein, such as, but not limited to, emissions. A key flexibility is to accommodate desired dwell time at stops and to consider constraints on earliest arrival and departure at a location as may be required, for example, in single-route operations where the time to be in or get by a siding (or other designated area such as an intersecting waterway) is critical.

Exemplary embodiments of the trip optimizer system find a fuel-optimal trip from distance $D_0$ to $D_M$, traveled in time T, with M−1 intermediate stops at $D_1, \ldots, D_{M-1}$, and with the arrival and departure times at these stops constrained by:

$$t_{min}(i) \leq t_{arr}(D_i) \leq t_{max}(i) - \Delta t_i$$

$$t_{arr}(D_i) + \Delta t_i \leq t_{dep}(D_i) \leq t_{max}(i) \quad i=1, \ldots, M-1$$

where $t_{arr}(D_i)$, $t_{dep}(D_i)$, and $\Delta t_i$ are the arrival, departure, and minimum stop time at the ith stop, respectively. Assuming that fuel-optimality implies minimizing stop time, therefore $t_{dep}(D_i) = t_{arr}(D_i) + \Delta t_i$ which eliminates the second inequality above. Suppose for each i=1, ..., M, the fuel-optimal trip from $D_{i-1}$ to $D_i$ for travel time t, $T_{min}(i) \leq t \leq T_{max}(i)$, is known. Let $F_i(t)$ be the fuel-use corresponding to this trip. If the travel time from $D_{j-1}$ to $D_j$ is denoted $T_j$, then the arrival time at $D_i$ is given by:

$$t_{arr}(D_i) = \sum_{j=1}^{i} (T_j + \Delta t_{j-1})$$

where $\Delta t_0$ is defined to be zero. The fuel-optimal trip from $D_0$ to $D_M$ for travel time T is then obtained by finding $T_i$, i= 1, ..., M, which minimize:

$$\sum_{i=1}^{M} F_i(T_i) \quad T_{min}(i) \leq T_i \leq T_{max}(i)$$

subject to:

$$t_{min}(i) \leq \sum_{j=1}^{i} (T_j + \Delta t_{j-1}) \leq t_{max}(i) - \Delta t_i \quad i = 1, \ldots, M-1$$

$$\sum_{j=1}^{M} (T_j + \Delta t_{j-1}) = T$$

Once a trip is underway, the issue is re-determining the fuel-optimal solution for the remainder of a trip (originally from $D_0$ to $D_M$ in time T) as the trip is traveled, but where disturbances preclude following the fuel-optimal solution. Let the current distance and speed be x and v, respectively, where $D_{i-1} < x < D_i$. Also, let the current time since the beginning of the trip be tact. Then the fuel-optimal solution for the remainder of the trip from x to $D_M$, which retains the original arrival time at $D_M$, is obtained by finding $\tilde{T}_i$, $T_j$, j=i+1, ... M, which minimize:

$$\tilde{F}_i(\tilde{T}_i, x, v) + \sum_{j=i+1}^{M} F_j(T_j)$$

subject to:

$$t_{min}(i) \leq t_{act} + \tilde{T}_i \leq t_{max}(i) - \Delta t_i$$

$$t_{min}(k) \leq t_{act} + \tilde{T}_i + \sum_{j=i+1}^{k} (T_j + \Delta t_{j-1}) \leq t_{max}(k) - \Delta t_k$$

$$k = i+1, \ldots, M-1$$

$$t_{act} + \tilde{T}_i + \sum_{j=i+1}^{M} (T_j + \Delta t_{j-1}) = T$$

Here, $\tilde{F}_i(t, x, v)$ is the fuel-used of the optimal trip from x to $D_i$, traveled in time t, with initial speed at x of v.

As discussed above, an exemplary way to enable more efficient re-planning is to construct the optimal solution for a stop-to-stop trip from partitioned segments. For the trip from $D_{i-1}$ to $D_i$, with travel time $T_i$, choose a set of intermediate points $D_{ij}$=1, ..., $N_i$−1. Let $D_{i0}$=$D_{i-1}$ and $D_{iN_i}$=$D_i$. Then express the fuel-use for the optimal trip from $D_{i-1}$ to $D_i$ as:

$$F_i(t) = \sum_{j=1}^{N_i} f_{ij}(t_{ij} - t_{i,j-1}, v_{i,j-1}, v_{ij})$$

where $f_{ij}(t, v_{i,j-1}, v_{ij})$ is the fuel-use for the optimal trip from $D_{i,j-1}$ to $D_{ij}$, traveled in time t, with initial and final speeds of $v_{i,j-1}$ and $v_{ij}$. Furthermore, $t_{ij}$ is the time in the optimal trip corresponding to distance $D_{ij}$. By definition, $t_{iN_i}$−$t_{i0}$=$T_i$, since the vehicle train is stopped at $D_{i0}$ and $D_{iN_i}$, $v_{i0}$=$v_{iN_i}$=0.

The above expression enables the function $F_i(t)$ to be alternatively determined by first determining the functions $f_{ij}(\cdot)$, $1 \leq j \leq N_i$, then finding $\tau_{ij}$, $1 \leq j \leq N_i$ and $v_{ij}$, $1 \leq j \leq N_i$, which minimize:

$$F_i(t) = \sum_{j=1}^{N_i} f_{ij}(\tau_{ij}, v_{i,j-1}, v_{ij})$$

subject to:

$$\sum_{j=1}^{N_i} \tau_{ij} = T_i$$

$$v_{min}(i, j) \leq v_{ij} \leq v_{max}(i, j) \quad j = 1, \ldots, N_i - 1$$

$$v_{i0} = v_{iN_i} = 0$$

By choosing $D_{ij}$ (e.g., at speed restrictions or meeting points), $v_{max}(i, j)$−$v_{min}(i, j)$ can be minimized, thus minimizing the domain over which $f_{ij}()$ needs to be known.

Based on the partitioning above, a simpler suboptimal re-planning approach than that described above is to restrict re-planning to times when the vehicle train is at distance points $D_{ij}$, $1 \leq i \leq M$, $1 \leq j \leq N_i$. At point $D_{ij}$, the new optimal trip from $D_{ij}$ to $D_M$ can be determined by finding $\tau_{ik}$, j<k≤$N_i$, $v_{ik}$, j<k<$N_i$, and $\tau_{mn}$, i<m≤M, $1 \leq n \leq N_m$, $v_{mn}$, i<m<M, $1 \leq n < N_m$, which minimize:

$$\sum_{k=j+1}^{N_i} f_{ik}(\tau_{ik}, v_{i,k-1}, v_{ik}) + \sum_{m=i+1}^{M} \sum_{n=1}^{N_m} f_{mn}(\tau_{mn}, v_{m,n-1}, v_{mn})$$

subject to:

$$t_{min}(i) \leq t_{act} + \sum_{k=j+1}^{N_i} \tau_{ik} \leq t_{max}(i) - \Delta t_i$$

$$t_{min}(n) \leq t_{act} + \sum_{k=j+1}^{N_i} \tau_{ik} + \sum_{m=i+1}^{n} (T_m + \Delta t_{m-1}) \leq t_{max}(n) - \Delta t_n$$

$$n = i+1, \ldots, M-1$$

$$t_{act} + \sum_{k=j+1}^{N_i} \tau_{ik} + \sum_{m=i+1}^{M} (T_m + \Delta t_{m-1}) = T$$

where:

$$T_m = \sum_{n=1}^{N_m} \tau_{mn}$$

A further simplification is obtained by waiting on the re-computation of $T_m$, $i<m\leq M$, until distance point $D_i$ is reached. In this way, at points $D_{ij}$ between $D_{i-1}$ and $D_i$, the minimization above needs only be performed over $\tau_{ik}$, $j<k\leq N_i$, $v_{ik}$, $j<k<N_i$. $T_i$ is increased as needed to accommodate any longer actual travel time from $D_{i-1}$ to $D_{ij}$ than planned. This increase is later compensated, if possible, by the re-computation of $T_m$, $i<m\leq M$, at distance point $D_i$.

With respect to the closed-loop configuration disclosed above, the total input energy required to move a vehicle train 31 from point A to point B consists of the sum of four components, specifically, difference in kinetic energy between points A and B; difference in potential energy between points A and B; energy loss due to friction and other drag losses; and energy dissipated by the application of brakes (or other braking or deceleration function). Assuming the start and end speeds to be equal (e.g., stationary), the first component is zero. Furthermore, the second component is independent of driving strategy. Thus, it suffices to minimize the sum of the last two components.

Following a constant speed profile minimizes drag loss. Following a constant speed profile also minimizes total energy input when braking is not needed to maintain constant speed. However, if braking is required to maintain constant speed, applying braking just to maintain constant speed will most likely increase total required energy because of the need to replenish the energy dissipated by the brakes. A possibility exists that some braking may actually reduce total energy usage if the additional brake loss is more than offset by the resultant decrease in drag loss caused by braking, by reducing speed variation.

After completing a re-plan from the collection of events described above, the new optimal notch/speed plan can be followed using the closed loop control described herein. However, in some situations there may not be enough time to carry out the segment decomposed planning described above, and particularly when there are critical speed restrictions that must be respected, an alternative is needed. The present invention accomplishes this with an algorithm referred to as "smart cruise control." The smart cruise control algorithm is an efficient way to generate, on the fly, an energy-efficient (hence fuel-efficient) sub-optimal prescription for driving the vehicle train 31 over a known terrain/course. This algorithm assumes knowledge of the position of the vehicle train 31 along the route 34 at all times, as well as knowledge of the grade and curvature of the route (or other characteristics of the route) versus position. The method relies on a point-mass model for the motion of the train 31, whose parameters may be adaptively estimated from online measurements of vehicle train motion as described earlier.

The smart cruise control algorithm has three principal components, specifically, a modified speed limit profile that serves as an energy-efficient guide around speed limit reductions; an ideal throttle or dynamic brake setting profile that attempts to balance between minimizing speed variation and braking; and a mechanism for combining the latter two components to produce a notch (or other throttle) command, employing a speed feedback loop to compensate for mismatches of modeled parameters when compared to reality parameters. Smart cruise control can accommodate strategies in the present invention that do no active braking (e.g., the driver is signaled and assumed to provide the requisite braking) or a variant that does active braking.

With respect to the cruise control algorithm that does not control dynamic braking, the three exemplary components are a modified speed limit profile that serves as an energy-efficient guide around speed limit reductions, a notification signal directed to notify the operator when braking should be applied, an ideal throttle profile that attempts to balance between minimizing speed variations and notifying the operator to apply braking, a mechanism employing a feedback loop to compensate for mismatches of model parameters to reality parameters.

Also included in the trip optimizer system is an approach to identify key parameter values of the vehicle train 31. For example, with respect to estimating train mass, a Kalman filter and a recursive least-squares approach may be utilized to detect errors that may develop over time.

Figure 7:
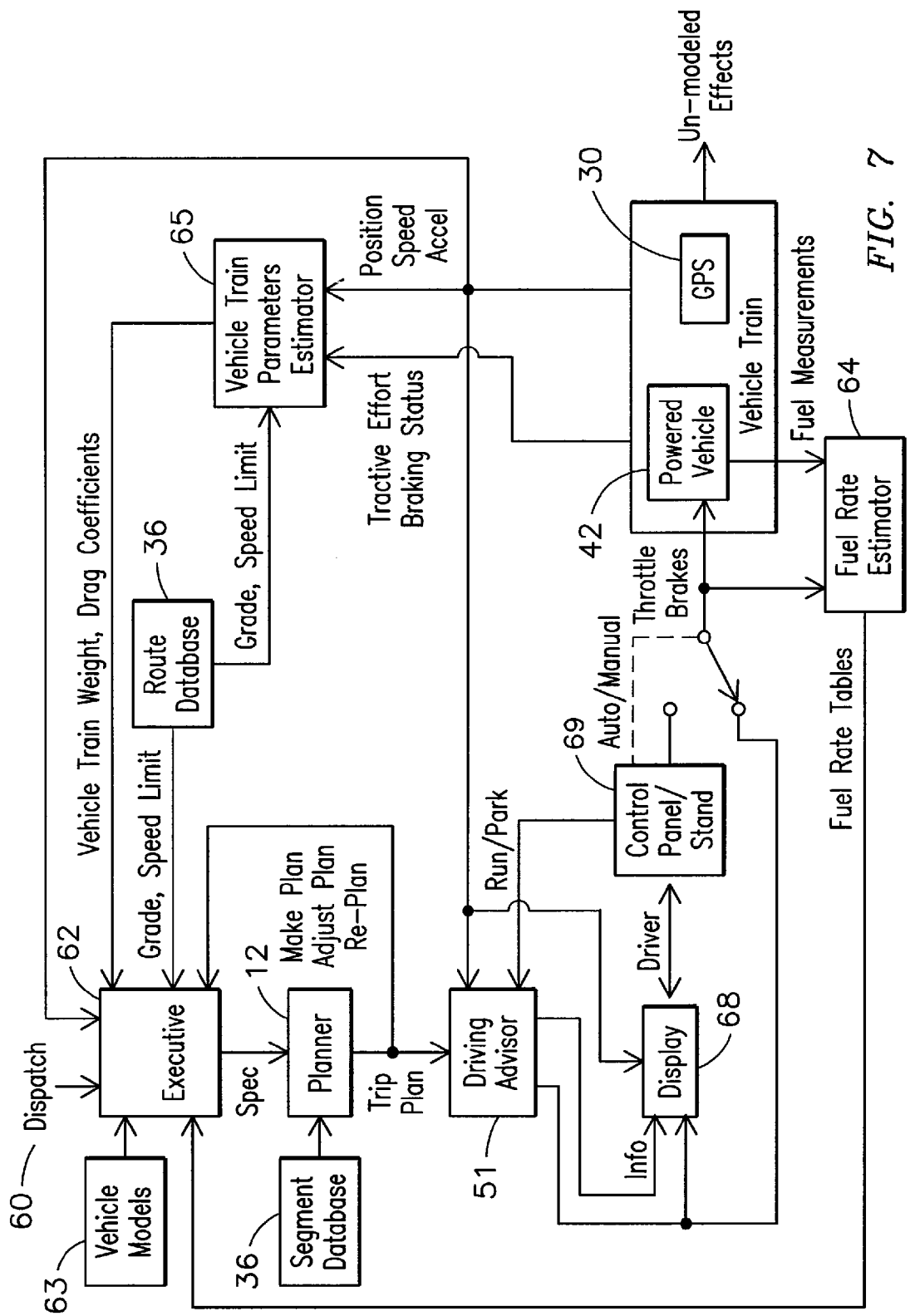
FIG. 7 is a schematic view of an embodiment of a system for optimizing a mission of a powered system, e.g., a trip optimizer system for a marine vessel or other vehicle, according to the present invention.

FIG. 7 depicts a schematic view of the trip optimizer system, according to an additional embodiment of the present invention. As discussed previously, a remote facility, such as a dispatch 60, can provide information to an executive control element 62. Also supplied to the executive control element 62 is information from a vehicle modeling database 63, information from a route database 36 such as, but not limited to, route grade information and speed limit information, estimated vehicle train parameters such as, but not limited to, vehicle train weight and drag coefficients, and fuel rate tables from a fuel rate estimator 64. The executive control element 62 supplies information to the planner 12, which is disclosed in more detail in FIG. 1. Once a trip plan has been calculated, the plan is supplied to a driving advisor, driver (operator), or controller element 51. The trip plan is also supplied to the executive control element 62 so that it can compare the trip when other new data is provided.

As discussed above, the driving advisor 51 can automatically set a throttle power, either a pre-established throttle setting or an optimum continuous throttle power. In addition to supplying a speed command to the marine vessel or other powered vehicle 42, a display 68 is provided so that the operator can view what the planner has recommended. The operator also has access to a control panel 69. Through the control panel 69 the operator can decide whether to apply the notch power recommended. Towards this end, the operator may limit a targeted or recommended power. That is, at any time the operator always has final authority over what power setting the consist will operate at. This includes deciding whether to apply braking if the trip plan recommends slowing the vehicle train 31. For example, if operating in dark territory, or where information from wayside equipment cannot electronically transmit information to a vehicle train and instead the operator views visual signals from the wayside equipment, the operator inputs commands based on information contained in the route database and visual signals from the wayside equipment. Based on how the vehicle train 31 is functioning, information regarding fuel measurement is supplied to the fuel rate estimator 64. Since direct measurement of fuel flows is not typically available in a consist, all information on fuel consumed so far within a trip and projections into the future following optimal plans is carried out using calibrated physics models such as those used in developing the optimal plans. For example, such predictions may include, but are not limited to, the use of measured gross horse-power and known fuel characteristics to derive the cumulative fuel used.

The vehicle train 31 also has a locator device 30 such as a GPS sensor, as discussed above. Information is supplied to the vehicle train parameters estimator 65. Such information may include, but is not limited to, GPS sensor data, tractive/braking effort data, braking status data, speed, and any changes in speed data. With information regarding grade and speed limit information, vehicle train weight and drag coefficients information is supplied to the executive control element 62.

Exemplary embodiments of the trip optimizer system may also allow for the use of continuously variable power throughout the optimization planning and closed loop control implementation. In the rail context, for example, the power of a conventional locomotive is typically quantized to eight discrete levels. The same may be true for certain marine vessels, as being limited to discrete throttle levels. Modern powered vehicles can realize continuous variation in horsepower which may be incorporated into the previously described optimization methods. With continuous power, the marine vessel or other powered vehicle 42 can further optimize operating conditions, e.g., by minimizing auxiliary loads and power transmission losses, and fine tuning engine horsepower regions of optimum efficiency, or to points of increased emissions margins. Examples include, but are not limited to, minimizing cooling system losses, adjusting alternator voltages, adjusting engine speeds, and reducing number of powered axles. Further, the marine vessel or other powered vehicle 42 may use the on-board route database 36 and the forecasted performance requirements to minimize auxiliary loads and power transmission losses to provide optimum efficiency for the target fuel consumption/emissions. Examples include, but are not limited to, reducing a number of powered axles on flat terrain and pre-cooling the vehicle engine prior to entering a tunnel.

Exemplary embodiments of the present invention may also use the on-board route database 36 and the forecasted performance to adjust the vehicle performance, such as to insure that the vehicle train has sufficient speed as it approaches a hill, tunnel, area of fast current, or the like. For example, this could be expressed as a speed constraint at a particular location that becomes part of the optimal plan generation created solving the equation (OP). Additionally, embodiments of the present invention may incorporate vehicle- and/or vehicle train-handling rules, such as, but not limited to, tractive effort ramp rates, and maximum braking effort ramp rates. These may be incorporated directly into the formulation for optimum trip profile or alternatively incorporated into the closed loop regulator used to control power application to achieve the target speed.

In one embodiment, the trip optimizer system of the present invention is only installed on a lead vehicle of a consist. Even though the system is not dependant on data or interactions with other vehicles, it may be integrated with a consist manager, as disclosed in U.S. Pat. No. 6,691,957 and U.S. Pat. No. 7,021,588 (owned by the Assignee and both incorporated by reference), and/or a consist optimizer functionality to improve efficiency. Interaction with multiple separate vehicles or vehicle trains is not precluded, as illustrated by the example of dispatch arbitrating two "independently optimized" vehicles or vehicle trains described herein.

Vehicle trains with distributed power systems can be operated in different modes. One mode is where all vehicles in the vehicle train operate at the same throttle command. So if the lead vehicle is commanding motoring—N8, all units in the vehicle train will be commanded to generate motoring—N8 power. Another mode of operation is "independent" control. In this mode, vehicles or sets of vehicles distributed throughout the vehicle train can be operated at different motoring or braking powers. For example, in the case of a railroad train, as the train crests a mountaintop, the lead locomotives (on the down slope of mountain) may be placed in braking, while the locomotives in the middle or at the end of the train (on the up slope of mountain) may be in motoring. This is done to minimize tensile forces on the mechanical couplers that connect the railcars and locomotives. Traditionally, operating the distributed power system in "independent" mode required the operator to manually command each remote vehicle or set of vehicles via a display in the lead vehicle. Using the physics-based planning model, vehicle train set-up information, on-board route database, on-board operating rules, location determination system, real-time closed loop power/brake control, and sensor feedback, the system is able to automatically operate the distributed power system in "independent" mode.

When operating in distributed power, the operator in a lead vehicle can control operating functions of remote vehicles in the remote consists via a control system, such as a distributed power control element. Thus when operating in distributed power, the operator can command each consist to operate at a different throttle power level (or one consist could be in motoring and another could be in braking), wherein each individual vehicle in the consist operates at the same throttle power. In an exemplary embodiment, with the trip optimizer system installed on the vehicle train, and typically in communication with the distributed power control element, when a throttle power level for a remote consist is desired as recommended by the optimized trip plan, the system will communicate this power setting to the remote consists for implementation. As discussed below, the same is true regarding braking/deceleration.

Embodiments of the present invention may be used with consists in which the powered vehicles are not contiguous, e.g., with 1 or more powered vehicles up front and others in the middle and/or at the rear of the vehicle train. Such configurations are called distributed power, wherein the standard connection between the powered vehicles is replaced by radio link or auxiliary cable to link the powered vehicles externally. When operating in distributed power, the operator in a lead powered vehicle can control operating functions of remote powered vehicles in the consist via a control system, such as a distributed power control element. In particular, when operating in distributed power, the operator can command each consist to operate at a different throttle power level (or one consist could be in motoring and other could be in braking) wherein each individual powered vehicle in the consist operates at the same throttle power level.

In an exemplary embodiment, with the trip optimizer system installed on the vehicle train, and typically in communication with the distributed power control element, when a throttle power level for a remote consist is desired as recommended by the optimized trip plan, the trip optimizer system will communicate this power setting to the remote consists for implementation. As discussed below, the same is true regarding braking/deceleration. When operating with distributed power, the optimization problem previously described can be enhanced to allow additional degrees of freedom, in that each of the remote units can be independently controlled from the lead unit. The value of this is that additional objectives or constraints relating to in-train forces may be incorporated into the performance function, assuming the model to reflect the in-train forces is also included. Thus, embodiments of the present invention may include the use of multiple throttle controls to better manage in-train forces as well as fuel consumption and emissions.

In a vehicle train utilizing a consist manager, the lead powered vehicle in a consist may operate at a different throttle power setting than other powered vehicles in that consist. The other powered vehicles in the consist operate at the same throttle power setting. Embodiments of the present invention may be utilized in conjunction with the consist manager to command throttle power settings for the vehicles in the consist. Thus, since the consist manager divides a consist into two groups, namely, lead powered vehicle and trail units, the lead powered vehicle will be commanded to operate at a certain throttle power and the trail powered vehicles are commanded to operate at another certain throttle power. In an exemplary embodiment, the distributed power control element may be the system and/or apparatus where this operation is housed.

Likewise, when a consist optimizer is used with a consist, the trip optimizer system can be used in conjunction with the consist optimizer to determine throttle power for each powered vehicle in the consist. For example, suppose that a trip plan recommends a throttle power setting of 4 for the consist. Based on the location of the vehicle train, the consist optimizer will take this information and then determine the throttle power setting for each powered vehicle in the consist. In this implementation, the efficiency of setting throttle power settings over intra-train communication channels is improved. Furthermore, as discussed above, implementation of this configuration may be performed utilizing the distributed control system.

Furthermore, as discussed previously, exemplary embodiments of the trip optimizer system may be used for continuous corrections and re-planning with respect to when the vehicle train uses braking based on upcoming items of interest, such as but not limited to, railroad crossings, grade changes, sidings, depot yards, fuel stations, docks, loading stations, canals, locks, slow traffic or low wake areas, etc., where each powered vehicle in the consist may require a different braking option. For example, if a railroad train is coming over a hill, the lead locomotive may have to enter a braking condition whereas the remote locomotives, having not reached the peak of the hill may have to remain in a motoring state.

Figure 8:
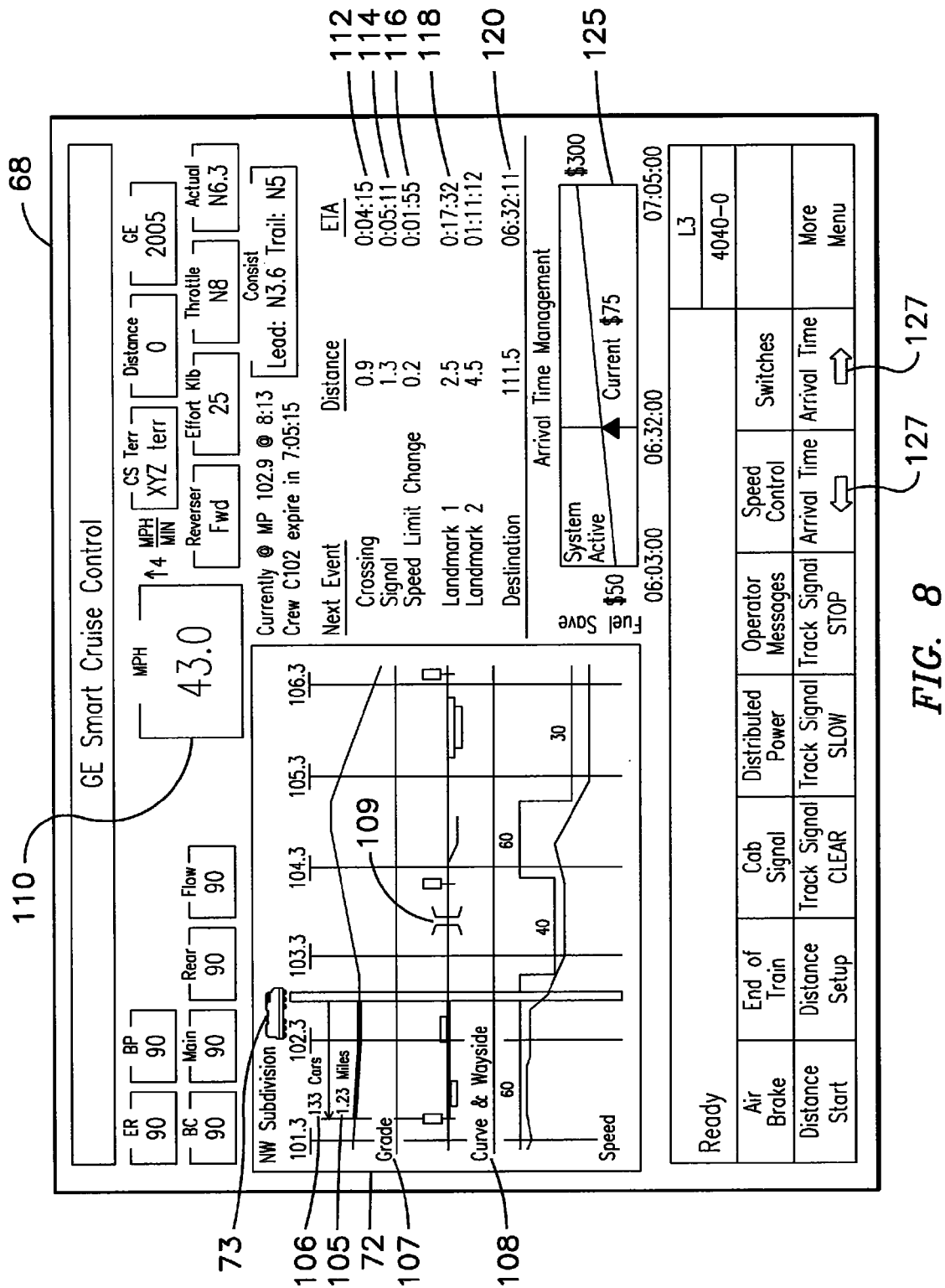
FIG. 8 depicts an exemplary embodiment of a dynamic display for use by an operator.
Figure 9:
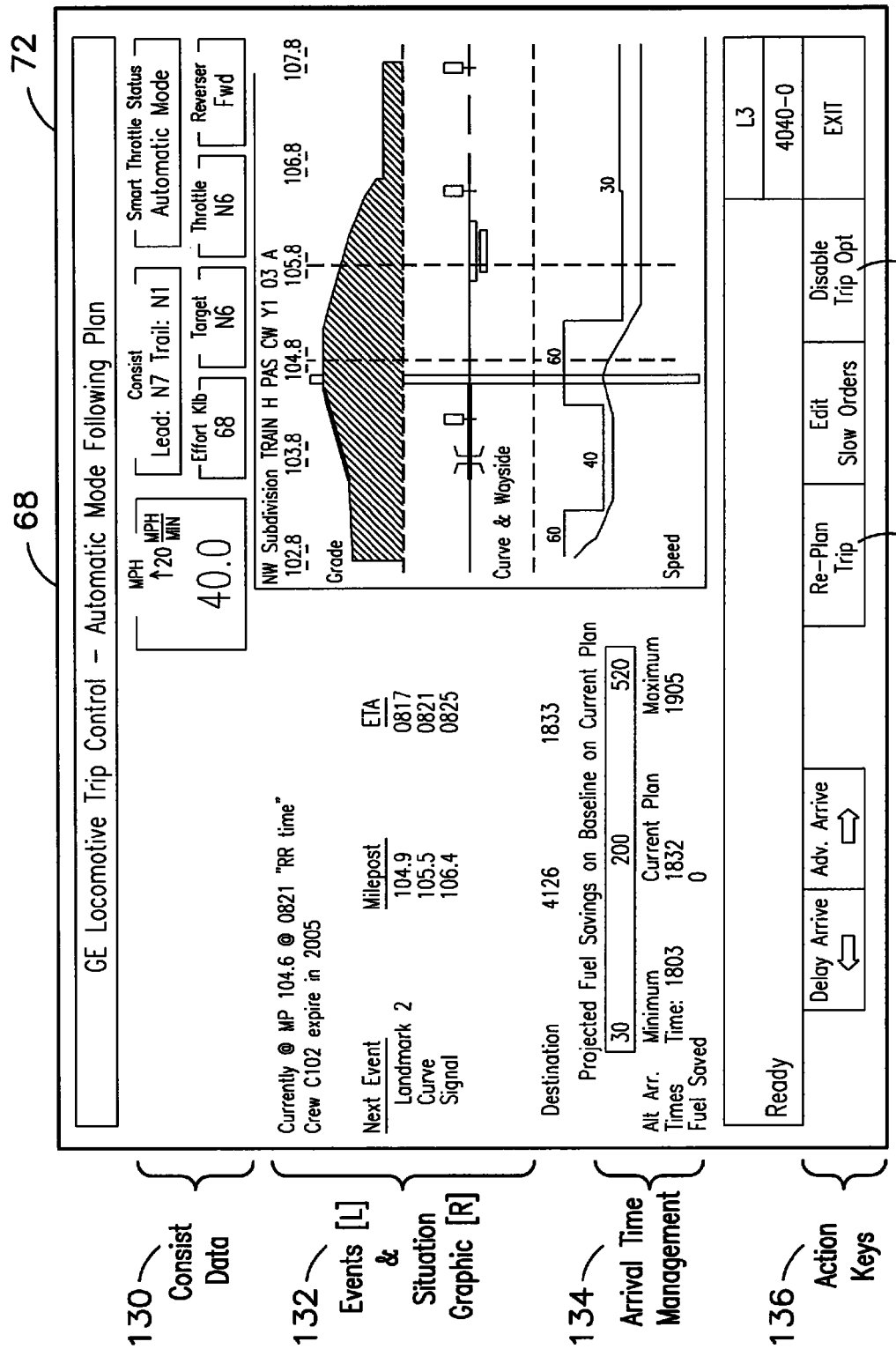
FIG. 9 depicts another exemplary embodiment of a dynamic display for use by the operator.
Figure 10:
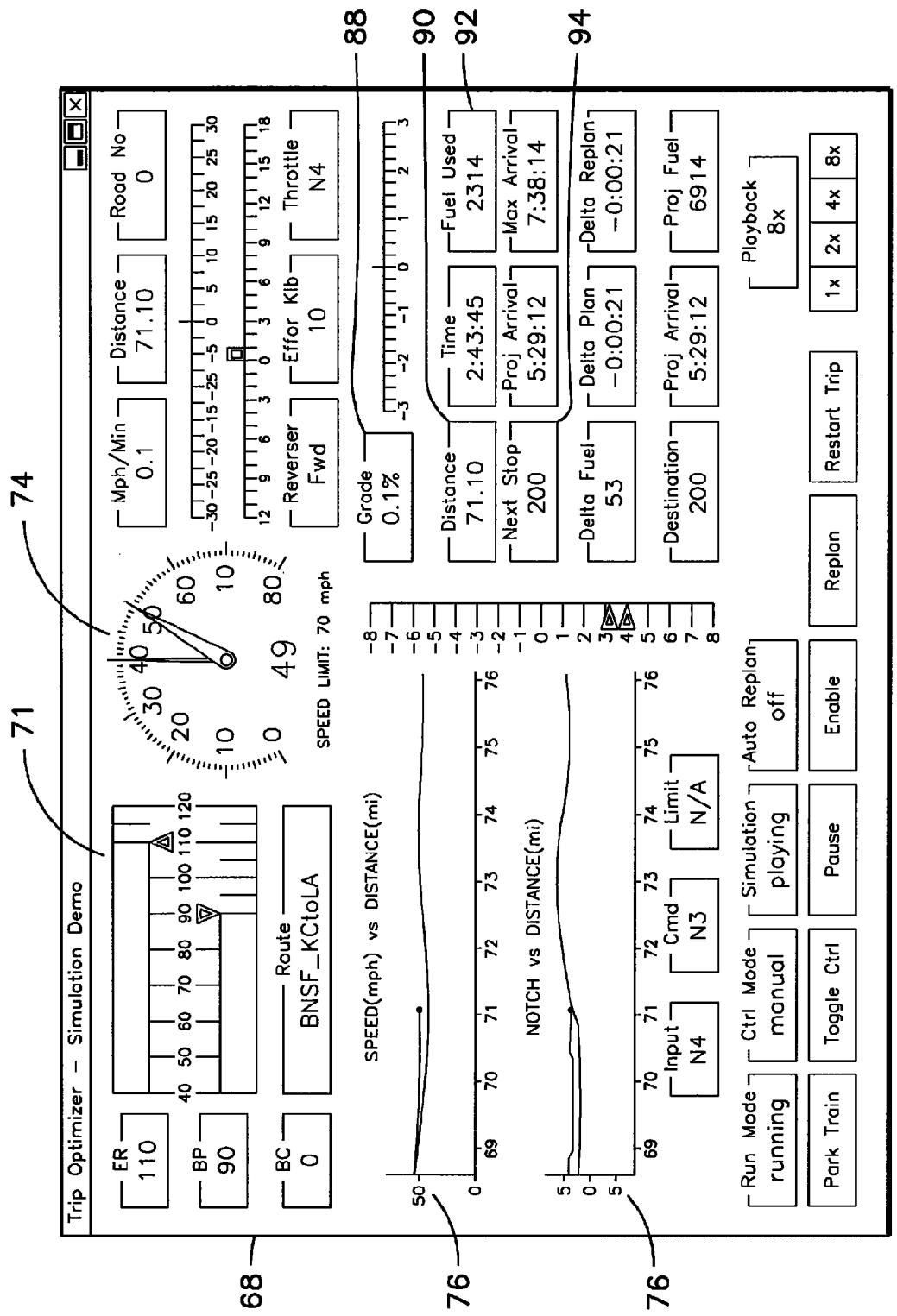
FIG. 10 depicts another exemplary embodiment of a dynamic display for use by the operator.

FIGS. 8, 9, and 10 depict exemplary illustrations of dynamic displays 68 for use by the operator. The examples given in FIGS. 8, 9, and 10 are with respect to rail vehicles, e.g., railroad trains and locomotives, but are more generally applicable to marine vessels and other vehicles also. As shown in FIG. 8, a trip profile 72 is provided in the form of a rolling map. Within the profile a location 73 of the locomotive is provided. Such information as train length 105 and the number of cars 106 in the train is also provided. Display elements are also provided regarding track grade 107, curve and wayside elements 108, including bridge location 109, and train speed 110. The display 68 allows the operator to view such information and also see where the train is along the route. Information pertaining to distance and/or estimate time of arrival to such locations as crossings 112, signals 114, speed changes 116, landmarks 118, and destinations 120 is provided. An arrival time management tool 125 is also provided to allow the user to determine the fuel savings that is being realized during the trip. The operator has the ability to vary arrival times 127 and witness how this affects the fuel savings. As discussed herein, those skilled in the art will recognize that fuel saving is an exemplary example of only one objective that can be reviewed with a management tool. Towards this end, depending on the parameter being viewed, other parameters discussed herein can be viewed and evaluated with a management tool that is visible to the operator. The operator is also provided information about how long the crew has been operating the train. In exemplary embodiments, time and distance information may either be illustrated as the time and/or distance until a particular event and/or location, or it may provide a total elapsed time.

As illustrated in FIG. 9, an exemplary display 68 provides information about consist data 130, an events and situation graphic 132, an arrival time management tool 134, and action keys 136. Similar information as discussed above is provided in this display as well. This display 68 also provides action keys 138 to allow the operator to re-plan as well as to disengage 140 the trip optimizer system.

FIG. 10 depicts another exemplary embodiment of the display. Data typical of a modern locomotive including airbrake status 71, analog speedometer with digital insert, or indicator, 74, and information about tractive effort in pounds force (or traction amps for DC locomotives) is visible. An indicator 74 is provided to show the current optimal speed in the plan being executed, as well as an accelerometer graphic to supplement the readout in mph/minute. Important new data for optimal plan execution is in the center of the screen, including a rolling strip graphic 76 with optimal speed and notch setting versus distance compared to the current history of these variables. In this exemplary embodiment, the location of the train is derived using the locator element. As illustrated, the location is provided by identifying how far the train is away from its final destination, an absolute position, an initial destination, an intermediate point, and/or an operator input.

The strip chart provides a look-ahead to changes in speed required to follow the optimal plan, which is useful in manual control, and monitors plan versus actual during automatic control. As discussed herein, such as when in the coaching mode, the operator can follow either the notch or speed suggested by the trip optimizer system. The vertical bar gives a graphic of desired and actual notch, which are also displayed digitally below the strip chart. When continuous notch power is utilized, as discussed above, the display will simply round to the closest discrete equivalent. The display may be an analog display so that an analog equivalent or a percentage or actual horse power/tractive effort is displayed.

Critical information on trip status is displayed on the screen, and shows the current grade the train is encountering 88, either by the lead locomotive, a location elsewhere along the train or an average over the train length. A distance traveled so far in the plan 90, cumulative fuel used 92, where the next stop is planned 94 (or a distance there from), current and projected arrival time 96, and expected time to be at next stop are also disclosed. The display 68 also shows the maximum possible time to destination possible with the computed plans available. If a later arrival was required, a re-plan would be carried out. Delta plan data shows status for fuel and schedule ahead or behind the current optimal plan. Negative numbers mean less fuel or early compared to plan, positive numbers mean more fuel or late compared to plan, and typically tradeoff in opposite directions (slowing down to save fuel makes the train late and conversely).

At all times, these displays 68 give the operator a snapshot of where he stands with respect to the currently instituted driving plan. This display is for illustrative purpose only as there are many other ways of displaying/conveying this information to the operator and/or dispatch. Towards this end, the information disclosed above could be intermixed to provide a display different than the ones disclosed.

Another feature that may be included in the trip optimizer system is allowing for the generating of data logs and reports. This information may be stored on the vehicle train and downloaded to an off-board system at some point in time. The downloads may occur via manual and/or wireless transmission. This information may also be viewable by the operator via the locomotive display. The data may include such information as, but not limited to, operator inputs, time system is operational, fuel saved, fuel imbalance across locomotives in the vehicle train, vehicle train journey off course, system diagnostic issues such as if a GPS sensor is malfunctioning.

Since trip plans must also take into consideration allowable crew operation time, the system of the present invention may take such information into consideration as a trip is planned. For example, if the maximum time a crew may operate is eight hours, then the trip shall be fashioned to include stopping location for a new crew to take the place of the present crew. Such specified stopping locations may include, but are not limited to rail yards, meet/pass locations, docking stations, ports of call, etc. If, as the trip progresses, the trip time may be exceeded, the trip optimizer system may be overridden by the operator to meet criteria as determined by the operator. Ultimately, regardless of the operating conditions of the vehicle train, such as but not limited to high load, low speed, train stretch conditions, etc., the operator remains in control to command a speed and/or operating condition of the vehicle or vehicle train.

Using the trip optimizer system, the vehicle train may operate in a plurality of manners. In one operational concept, the system may provide commands for commanding propulsion and dynamic braking. The operator then handles all other vehicle train functions. In another operational concept, the system may provide commands for commanding propulsion only. The operator then handles dynamic braking and all other vehicle train functions. In yet another operational concept, the system may provide commands for commanding propulsion, dynamic braking, and application of the airbrake. The operator then handles all other vehicle train functions.

The trip optimizer system may also be configured to notify the operator of upcoming items of interest or actions to be taken. Specifically, using forecasting logic as described above, the continuous corrections and re-planning to the optimized trip plan, and/or the route database, the operator can be notified of upcoming crossings, signals, grade changes, brake actions, sidings, rail yards, fuel stations, docks, slow or low wake zones, restricted zones, channel or other navigational makers, etc. This notification may occur audibly and/or through the operator interface.

Specifically, using the physics based planning model, vehicle train set-up information, on-board route database, on-board operating rules, location determination system, real-time closed loop power/brake control, and sensor feedback, the system presents and/or notifies the operator of required actions. The notification can be visual and/or audible. Examples include notifying of crossings that require the operator to activate a horn and/or bell, and, in the case of rail vehicles, notifying of "silent" crossings that do not require the operator activate the locomotive horn or bell.

In another exemplary embodiment, using the physics based planning model discussed above, vehicle train set-up information, on-board route database, on-board operating rules, location determination system, real-time closed power/brake control, and sensor feedback, the system may present the operator information (e.g., a gauge on display) that allows the operator to see when the vehicle train will arrive at various locations, as illustrated in FIG. 9. The system allows the operator to adjust the trip plan (e.g., target arrival time). This information (actual estimated arrival time or information needed to derive off-board) can also be communicated to the dispatch center to allow the dispatcher or dispatch system to adjust the target arrival times. This allows the system to quickly adjust and optimize for the appropriate target function (for example trading off speed and fuel usage).

In one example involving marine vessels, a plurality of tugs may be operating together where all are moving the same larger vessel, where each tug is linked in time to accomplish the mission of moving the larger vessel. In another example, a single marine vessel may have a plurality of engines. Off-highway vehicle (OHV) applications may involve a fleet of vehicles that have a same mission to move earth, from location "A" to location "B," where each OHV is linked in time to accomplish the mission. With respect to a stationary power generating station, a plurality of stations may be grouped together for collectively generating power for a specific location and/or purpose. In another exemplary embodiment, a single station is provided, but with a plurality of generators making up the single station. In one example involving locomotive vehicles, a plurality of diesel powered systems may be operated together where all are moving the same larger load, where each system is linked in time to accomplish the mission of moving the larger load. In another exemplary embodiment a locomotive vehicle may have more than one diesel powered system.

FIG. 11 illustrates an exemplary embodiment of a system 200 for controlling a marine vessel 204 through a waterway 210, e.g., for optimizing a path for the marine vessel 204 along the waterway 210 from a first location 212 (e.g., an initial location) to a second (e.g., final) location 214. For example, the marine vessel 204 may be a watercraft which is traveling from an open-water location to a docking location at a docking station within the waterway, for example. The marine vessel 204 may be any vessel having a water propulsion system and a directional system, such as a vessel having a diesel engine and an alternator and/or rectifier combination which provides A/C or D/C electrical power to an electrically powered propulsion system, for example. However, the marine vessel discussed in the embodiments of the present invention need not be powered by a diesel engine, provided that it features a water propulsion system and a directional system.

As illustrated in FIG. 11, the system 200 includes a processor 216 positioned on the marine vessel 204; however the processor 216 may be positioned at a remote location from the marine vessel 204, as discussed in the later embodiments of the present invention. The processor 216 includes a memory 222, which stores one or more operating parameter(s) of the marine vessel 204 and a navigational data of the waterway 210. "Operating parameter" refers to an aspect of the marine vessel as relating to its propulsion through water. Therefore, in an exemplary embodiment of the present invention, the stored operating parameter may be a mass of the marine vessel 204, a drag coefficient of the marine vessel 204, and/or a power characteristic of a propulsion system 228 of the marine vessel 204, for example. Additionally, in an exemplary embodiment, the stored navigational data of the waterway 210 includes one or more of a geographical map of the waterway 210 in computer readable form, a location of one or more obstacle(s) within the waterway 210, one or more dimension(s) of the waterway 210, one or more dock location(s) along the waterway 210, forecast data of the waterway 210, water current data of the waterway 210, and/or vessel traffic data within the waterway 210, for example.

The marine vessel 204 includes a propulsion system 228 and a directional system 234, which are both coupled to the processor 216. The propulsion system 228 and directional system 234 respectively impart a selective propulsion force on the marine vessel 204 at a selective direction based on a respectively received propulsion command and direction command from the processor 216. More generally, the propulsion system and directional system are configured to impart a velocity to the marine vessel based on commands received from the processor, where "velocity" refers to a vector quantity comprising a speed and direction. The propulsion system 228 may include, for example, one or more propellers, a power source (e.g., engine) for driving the propellers, and a drive train connecting the power source and propellers. The propulsion system need not be water based, and could comprise an air-driver system (e.g., fans/propellers) and chemical propellant-based systems. The directional system 234 may include, for example, a mechanism for changing the position or orientation of the propellers in the water, a rudder or rudder system, or the like. The propulsion system and directional system may be all or partially integrated, such as in an outboard motor.

Additionally, the processor 216 includes a transceiver 252 which forms a communication link 259 with a remote station 257. Although the remote station 257 in FIG. 11 is positioned adjacent to the second location 214, the remote station may be positioned at any location within a proximate range capable of establishing the communication link 259 with the processor 216. In an embodiment discussed below, for example, the remote station 257 may be positioned adjacent to a final location 214. The remote station 257 transmits the one or more operating parameter(s) of the marine vessel 204 and/or the navigational data of the waterway 210 to the processor 216 over the communication link 259 subsequent to receiving a request signal from the processor 216 over the communication link.

Using the optimization methods described in detail above, the processor 216 determines the optimal path 202 for the marine vessel 204 through the waterway 210 from the first location 212 to the second location 214, in addition to an optimal propulsion command 229 (FIG. 12) and optimal direction command 235 (FIGS. 13-14) to be transmitted to the propulsion and directional systems 228,234 at a respective incremental location 240 along the optimal path 202. FIG. 12 illustrates the optimal propulsion command 229 transmitted from the processor 216 to the propulsion system 228, along the waterway 210 from the first location 212 to the second location 214. Similarly, FIGS. 13-14 illustrates variations of the optimal direction command 235 transmitted from the processor 216 to the directional system 234, along the waterway 210 from the first location 212 to the second location 214. The processor 216 determines the optimal path 202, and the optimal propulsion command 229 and optimal direction command 235, so to optimize a performance characteristic of the marine vessel 204 along the optimal path 202. In an exemplary embodiment of the present invention, the optimization of the performance characteristic of the marine vessel 204 along the optimal path 202 is one of an optimization of a fuel efficiency of the marine vessel 204 along the optimal path 202, an optimization of an energy efficiency of the marine vessel 204 along the optimal path 202, an optimization of a transit time of the marine vessel 204 along the optimal path 202, and/or a waypoint arrival time at an incremental location 240 of the marine vessel 204 along the optimal path 202, for example. The determination of the optimal path 202, the optimal propulsion command 229, and the optimal direction command 235 is based on the first location 212, the second location 214, the one or more operating parameter(s) of the marine vessel 204, the designated performance characteristic to be optimized, and the received navigational data of the waterway 210. However, these determinations may be based on less than all of these parameters, or may be based on additional parameters related to the operating conditions of the marine vessel 204 and/or the conditions of the waterway 210, for example.

Another, more general embodiment relates to a system 200 for controlling a marine vessel 204 through a waterway 210. The system 200 comprises a processor 216, which may be onboard or off board the marine vessel. The system 200 also comprises a propulsion system 228 and a directional system 234 on the marine vessel 204. The propulsion system and the directional system are coupled to the processor and are configured to impart a velocity (vector quantity of a speed and direction) to the marine vessel based on commands received from the processor. The processor is configured to determine an optimal path 202 for the marine vessel through the waterway from a first location 212 to a second location 214, and to determine the commands to be transmitted to the propulsion and directional systems at respective incremental locations along the optimal path so as to optimize a performance characteristic of the marine vessel along the optimal path. The optimal path and commands are determined based on the first location, the second location, at least one operating parameter of the marine vessel, the performance characteristic, and navigational data of the waterway.

As the marine vessel 204 travels along the optimal path 202, the processor 216 may be switched into an automatic mode to ensure that the marine vessel 204 maintains a path of travel along the optimal path 202. The marine vessel 204 includes a position determination device 264 to measure a position of the marine vessel, such as a global position system (GPS) transceiver in communication with one or more GPS satellites, an inertial navigational system, a LORAN system, a sensed magnetic compass, and/or a radar system such as a primary, transponder or Doppler radar system, for example. The position determination device 264 is coupled to the processor 216 to transmit the measured position to the processor 216 as the marine vessel 204 travels along the optimal path 202 of the waterway 210. The determined optimal path 202 by the processor 216 includes an expected position of the marine vessel 204 through the waterway 210 from the first location 212 to the second location 214. At each incremental location 240 from the first location 212 to the second location 214, the processor 216 samples the actual position of the vessel, after which it compares the measured position of the marine vessel 204 with the expected position of the marine vessel 204 at the respective incremental location 240. If the measured positioned does not vary from the expected position, no corrective action is required. If the measured position of the marine vessel 204 varies from the expected position, but by less than a predetermined threshold stored in the memory 222 of the processor 216, the processor 216 transmits a corrective propulsion command and a corrective direction command so that the marine vessel 204 is propelled toward the expected position and the optimal path 202. Alternatively, if the measured position of the marine vessel 204 varies from the expected position by less than the stored predetermined threshold, and if the processor 216 determines that the variation is due to an error in one of the inputted first location, second location, the one or more operating parameter(s), and the navigational data, then the processor 216 is configured to correct the error in the inputted data so to avoid future variations between the measured and expected position of the marine vessel 204 at subsequent incremental locations 240 along the waterway 210.

As illustrated in FIG. 11, if the measured position 274 of the marine vessel 204 varies with the expected position 276 by more than the stored predetermined threshold, the processor 216 determines a substitute optimal path 270 for the marine vessel 204 through the waterway 210 from the measured position 274 to the second location 214. In other words, the processor 216 recalculates an optimal path 270, with the measured position 274 being used in place of the first location 212 for the previous optimal path 202 determination. Additionally, the processor 216 determines a substitute optimal propulsion command and a substitute optimal direction command at a respective incremental location along the substitute optimal path 270. The determination of the substitute optimal path 270, the substitute optimal propulsion command, and the substitute optimal direction command is based on the measured position 274, the second location 214, the one or more operating parameter(s), the designated performance characteristic to be optimized, and the navigational data.

At any time while the marine vessel 204 is traveling along the optimal path 202 from the first location 212 to the second location 214, and the processor 216 is in the automatic mode, an operator of the marine vessel 204 may switch the processor 216 from the automatic mode to a manual mode. In the manual mode, at the respective incremental locations 240, the measured position, the expected position, the optimal propulsion command 229, and the optimal direction command 235 are transmitted to and displayed on an operator interface (such as those shown in FIGS. 8, 9, and 10). After viewing the operator interface, the operator may transmit a propulsion command equivalent to the optimal propulsion command 229 to the propulsion system 228 and may transmit a direction command equivalent to the optimal direction command 235 to the directional system 234. Additionally, the operator may transmit a propulsion and direction command which differ from the respective optimal propulsion and direction command, such as when unforeseeable circumstances arise, such as a sudden water current, vessel traffic, an obstacle, and/or the optimal commands appear to be inaccurate, to divert the marine vessel 204 away from the optimal path 202.

In an exemplary embodiment of the present invention, at each incremental location 240 along the waterway 210, the processor 216 determines and stores an emergency propulsion command and an emergency direction command in the memory 222. The emergency propulsion and direction commands are based on the measured position of the marine vessel 204 and a most proximate location of a dock location within the waterway 210, which is obtained from the stored navigational data, or can be designated by the operator on the interface. Thus, in an emergency situation, such as if an unforeseeable circumstance arises, such as an unforeseeable water current, vessel traffic, an obstacle, and/or marine vessel 204 system failure, an operator may switch the processor 216 from the automatic/manual mode into a safety mode, in which the processor 216 will transmit the emergency propulsion and direction commands to the propulsion system 228 and directional system 234, in order to direct the marine vessel 204 to the designated safe location. Alternatively, from an automatic mode, the processor 216 may compare the measured position with the navigational data, such as an obstacle within the waterway 210 and/or a boundary of the waterway 210, for example. If the processor 216 determines that the measured position is within a predetermined threshold of the navigational data, the processor 216 switches from the automatic mode to a safety mode and transmits the emergency propulsion and direction commands to the respective propulsion system 228 and directional system 234, for example.

The default safe position may be designated as the current location and the system simply commands the controls to stop propulsion.

An operator input interface may be provided within the marine vessel 204, including a display and an input device. The operator input interface is coupled to the processor 216, and is activated to input one or more of the first location, the second location, a desired transit time, and/or the performance characteristic to be optimized, for example. Subsequent to inputting this data, the input device is activated to prompt the processor 216 to determine the optimal path 202, the optimal propulsion command 229, and the optimal direction command 235 of the marine vessel 204 through the waterway 210.

When the marine vessel 204 approaches a final location 214 (e.g., a landing at which the vessel is supposed to dock), the position control of the water vessel 204 may be transferred from the processor 216 to a remote station 257, as the precise position control of the water vessel 204 at the final location 214, such as into a port location, may be difficult and require an outside viewpoint. As discussed above, the transceiver 252 of the processor 216 forms a communication link 259 with a remote station 257, such as a remote station positioned adjacent to the final location 214. After the marine vessel 204 has traveled along the optimal path 202 to within a threshold distance of the final location 214, the processor 216 may transmit a request command signal to the remote station 257 over the communication link 259, and the remote station 257 transmits an acknowledge command signal to the processor 216. After the transmission of the acknowledge command signal, the processor 216 ceases to transmit the optimal propulsion command 229 and optimal direction command 235 to the propulsion and directional systems 228,234. Instead, the remote station 257 transmits a respective propulsion command and direction command to the respective propulsion and directional system 228,234 at an incremental location along the threshold distance to the final location 214. The remote station 257 may feature a manual operator who transmits a propulsion and direction command to the marine vessel 204, based on his or her visual monitoring of the marine vessel 204 entering the final location 214.

As illustrated in FIG. 15, a combination of vessels 204,206 is presented, including the marine vessel 204 and a secondary marine vessel 206 that is coupled to the marine vessel 204. The secondary marine vessel 206 has a secondary propulsion system 230 and a secondary directional system 236 similar to the propulsion system 228 and directional system 234 of the marine vessel 204. The secondary marine vessel 206 includes a transceiver 254 which establishes a communication link 260 with the transceiver 252 of the marine vessel 204. Thus, the secondary propulsion system 230 and the secondary directional system 236 are coupled to the processor 216, through the communication link 260. Additionally, the secondary propulsion system 230 and secondary directional system 236 are coupled to a second processor 218 on the secondary marine vessel 206. The secondary propulsion system 230 imparts a selective propulsion force on the secondary marine vessel 206 at a selective direction based on a received propulsion command 231 (FIG. 16) and direction command 237 (FIGS. 17-18) from the processor 216. The processor 216 determines the optimal path 202 for the combination of vessels 204,206 through the waterway 210 from the first location 212 to the final or other second location 214. Travel of the combination of vessels 204,206 along the optimal path 202 is carried out based on a transmission of the respective optimal propulsion commands 229,231 and the respective optimal direction commands 235,237 to the combination of vessels 204,206 at the incremental locations 240 along the waterway 210. In addition to the one or more operating parameter(s) of the marine vessel 204, the memory 222 of the processor 216 stores one or more operating parameter(s) of the secondary marine vessel 206. In the illustrated example of FIG. 15, although the processor 216 of the marine vessel 204 determines the optimal propulsion commands 229,231 and optimal direction commands 235,237 which are transmitted to the combination of vessels 204,206, in an exemplary embodiment, the system 200 may be similarly configured such that the second processor 218 on the secondary marine vessel 206 determines the optimal path 202 for the combination of vessels 204,206, the respective optimal propulsion commands 229,231 and the respective optimal direction commands 235,237 of the combination of the vessels 204,206. The second processor 218 would determine these parameters in a similar manner as the processor 216 discussed above. Thus, the marine vessel 204 and the secondary marine vessel 206 may include similar on-board systems, each of which is capable of determining the optimal path 202, the respective propulsion commands, and the respective direction commands of the combination of the vessels 204,206.

Similar to the embodiments discussed above in regard to FIGS. 11-14, the processor 216 determines the optimal path 202 for the combination of vessels 204,206 through the waterway 210 from the first location 212 to the second location 214, the optimal propulsion commands 229,231, and the optimal direction commands 235,237 to be transmitted to the vessels 204,206 at the respective incremental locations 240 along the optimal path 202, so to optimize a performance characteristic of the vessels 204,206. As discussed in the regard to FIGS. 11-14, the optimization of the performance characteristic of the vessels 204,206 along the optimal path 202 is an optimization of one of a fuel efficiency of the vessels 204,206 along the optimal path 202, an optimization of an energy efficiency of the vessels 204,206 along the optimal path 202, an optimization of a transit time of the vessels 204,206 along the optimal path 202, and/or a waypoint arrival time at an incremental location 240 of the marine vessel 204 along the optimal path 202, for example. Additionally, as with the embodiments discussed above in regard to FIGS. 11-14, the determination of the optimal path 202, the optimal propulsion commands 229,231, and the optimal direction commands 235,237 is based on the first location, the second location, the one or more operating parameter(s) of the vessels 204,206, the designated performance characteristic to be optimized, and the navigational data, using the computational optimization methods described above.

Figure 19:
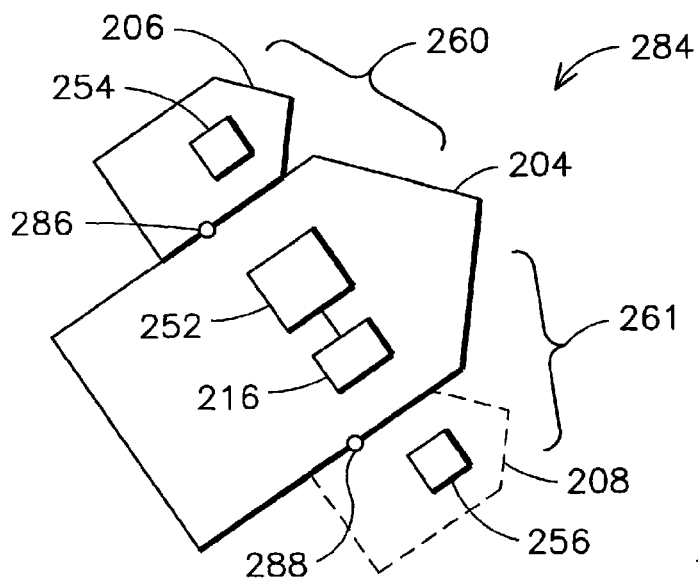
FIG. 19 illustrates a top schematic view of an exemplary embodiment of a combination of a marine vessel including a master controller, and a pair of secondary vessels utilized within a system for optimizing a path for the combination of the marine vessel and the pair of secondary vehicles, in accordance with the present invention.

FIG. 19 illustrates an exemplary embodiment of the marine vessel 204 and two secondary marine vessels 206,208 which are coupled to the marine vessel 204. The processor 216 is positioned on the marine vessel 204. The processor 216 determines an optimal spatial arrangement 284 of the secondary marine vessels 206,208, with respect to the marine vessel 204, including a respective optimal attachment location 286, 288 of the respective secondary marine vessels 206,208 with respect to the marine vessel 204. The determination of the respective optimal spatial arrangement 284 and the optimal attachment locations 286,288 are based on one or more of the operating parameter(s) of the marine vessel 204, the operating parameter(s) of the secondary marine vessels 206,208, the navigational data, the first location 212, and/or the second location 214.

As discussed above with regard to FIG. 19, the processor 216 is positioned on the marine vessel 204, and thus the marine vessel 204 may be designated as a master vessel, since it houses the processor 216 which determines the optimal path 202, optimal propulsion commands 229,231 and optimal direction commands 235,237. Additionally, the processor 216 which is positioned on the master vessel may be designated as the master processor. In this exemplary embodiment, the secondary marine vessels 206,208 may be designated as slave vessels, as they do not house the processor 216 which determines the optimal path 202, optimal propulsion commands 229,231, and the optimal direction commands 235, 237. However, as discussed above in regard to the secondary marine vessel 206 of FIG. 15, the secondary marine vessels 206,208 may include a respective processor which is capable of determining the optimal path 202, the optimal propulsion commands 229,231, and the optimal direction commands 235,237, of the combination of vessels 204, 206, 208. Thus, the designation of the master vessel among the vessels 204, 206, 208 is arbitrary and not limited to any one of the vessels 204, 206, 208, as each of the marine vessel 204, and the secondary marine vessels 206,208 include a similar on-board system which is capable of determining the optimal path 202, the optimal propulsion commands 229,231, and the optimal direction commands 235,237. The transceiver 252 is positioned on the marine vessel 204 (or master vessel) and the transceivers 254,256 are respectively positioned on the secondary marine vessels 206,208 (or slave vessels), so to establish respective communication links 260,261 between the marine vessel 204 and a first secondary marine vessel 206 and the marine vessel 204 and a second secondary marine vessel 208. Additionally, although FIG. 19 illustrates two secondary marine vessels coupled to the marine vessel, the present invention is not limited to any particular number of secondary vessels, or total number of vessels within the combination of vessels, provided that the vessels within the combination of vessels are capable of receiving the propulsion and direction commands from the designated master vessel. In an exemplary embodiment, the respective processor within the designated slave vessels 206,208 may receive the optimal propulsion and direction commands for the slave vessels 206,208 from the master processor 216 of the designated master vessel 204, and may execute these received optimal propulsion and direction commands on their respective slave vessel 206,208, for example. Thus, in an exemplary embodiment, the respective processor within the designated slave vessels 206,208 is configured to control the respective propulsion and direction system of the slave vessels 206,208, for example.

Referring back to FIG. 15, as with the embodiments discussed above with regard to FIGS. 11-14, a position determination device 266 is positioned on the secondary marine vessel 206 (or slave vessel) to measure a position of the secondary marine vessel 206. The position determination device 266 is coupled to the transceiver 254 to communicate the measured position of the secondary marine vessel 206 over the communication link 260 to the processor 216 on the marine vessel 204 (or master vessel). The optimal path 202 of the combination of vessels 204,206 includes an expected position of the secondary marine vessel 206 through the waterway 210 from the first location 212 to the second location 214. At the respective incremental locations 240, the processor 216 receives the measured position of the secondary marine vessel 206 from the communication link 260 and compares the measured position with the expected position of the secondary marine vessel 206 at the incremental location 240. Although FIG. 15 only illustrates a single secondary marine vessel 206, the secondary marine vessels 206,208 may be attached to the marine vessel 204, and the secondary marine vessel 208 would be handled similarly to the secondary marine vessel 206, as discussed herein. As with the embodiments discussed above with regard to FIGS. 11-14, if the processor 216 determines that the measured position of the secondary marine vessel 206 varies with the expected position of the secondary marine vessel 206 by less than a stored predetermined threshold, the processor 216 transmits a corrective propulsion command and a corrective direction command to the secondary marine vessel 206 over the communication link 260 so that the secondary marine vessel 206 is propelled toward the optimal path 202. However, if the processor 216 determines that the measured position of the secondary marine vessel 206 varies with the expected position of the secondary marine vessel 206 by greater than the predetermined threshold, the processor 216 determines a substitute optimal path (not shown) for the combination of vessels 204,206 through the waterway 210 from the measured position to the final location 214. Additionally, the processor 216 would determine a substitute optimal propulsion command and a substitute optimal direction command of the combination of vessels 204,206 at a respective incremental location along the substitute optimal path. The determination of the substitute optimal path, the substitute optimal propulsion command, and the substitute optimal direction command would be based on the measured position, the final location, the one or more operating parameter(s) of the marine vessel 204, the one or more operating parameter(s) of the secondary marine vessel 206, the performance characteristic to be optimized, and the navigational data.

Figure 20:
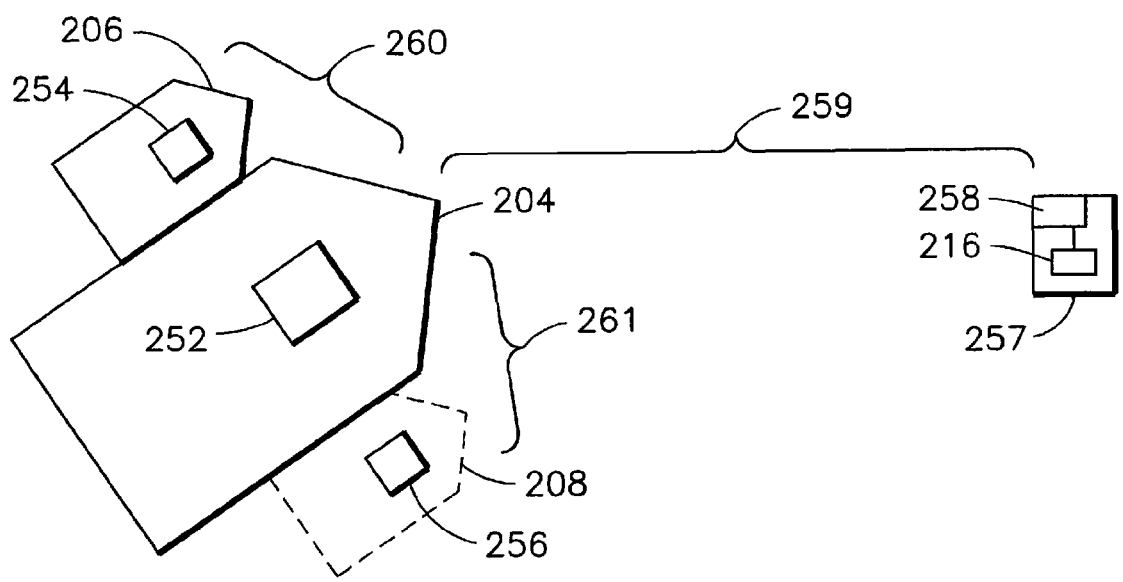
FIG. 20 illustrates a top schematic view of an exemplary embodiment of a combination of a marine vessel and a pair of secondary vessels, where the combination is in wireless communication with a master controller, and is utilized within a system for optimizing a path for the combination of the marine vessel and the pair of secondary vehicles, in accordance with the present invention.

FIG. 20 illustrates an arrangement of the combination of vessels 204, 206, 208 similar to FIG. 19, with the exception that the processor 216 is located on the remote station 257, and thus all of the vessels 204, 206, 208 are slave vessels, since none of the vessels house the processor 216 which determines the optimal path 202. The processor 216 establishes a communication link 259 with the transceiver 252 of the marine vessel 204, which in-turn establishes a respective communication link 260,261 with the respective transceivers 254,256 of the vessels 206,208. Thus, the optimal path 202 is determined by the processor 216, as discussed above, and the processor 216 communicates the optimal propulsion commands and optimal direction commands for the vessels 204, 206, 208 at the incremental locations 240 along the waterway 210, over the communication links 259, 260, 261.

Figure 21:
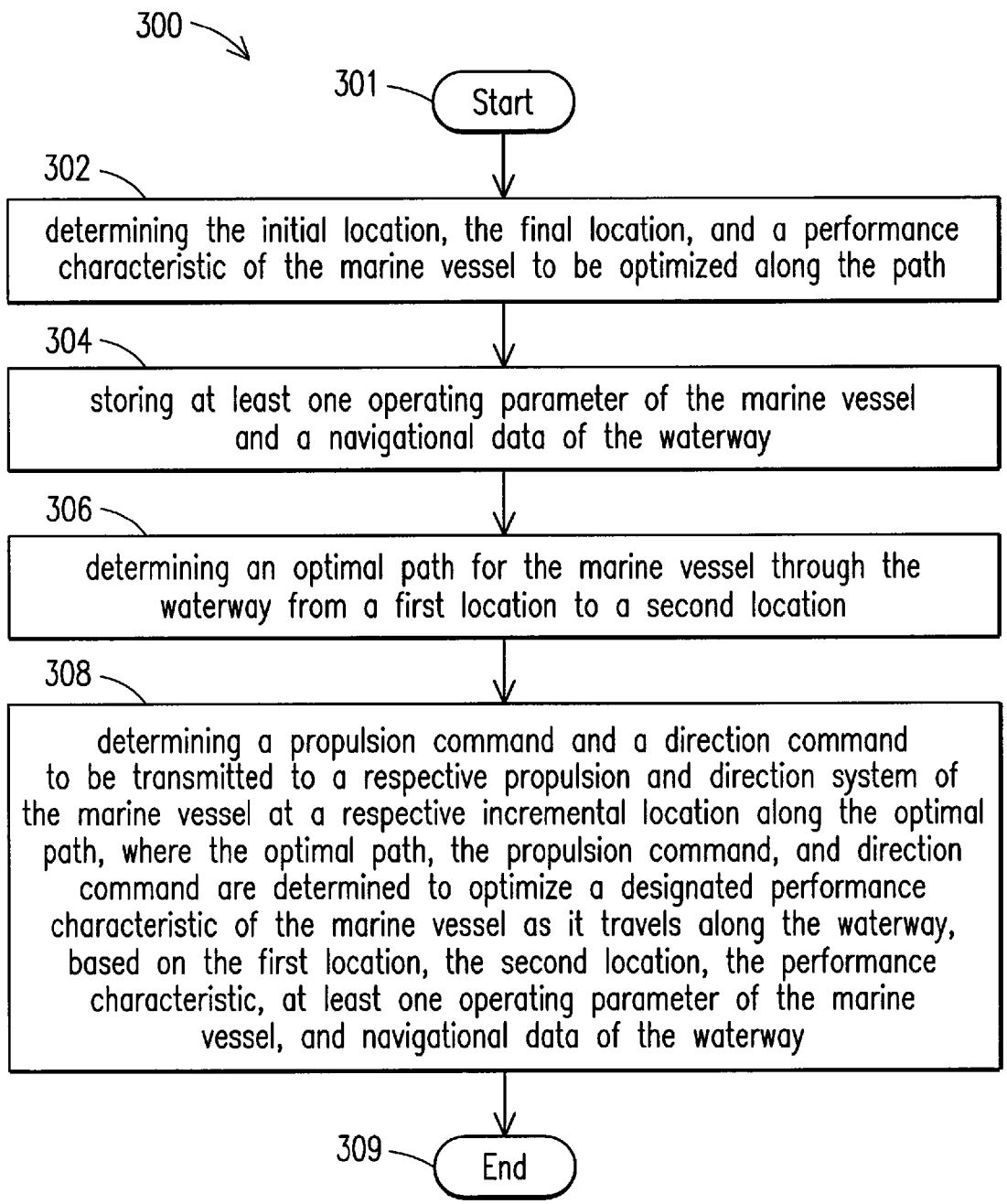
FIG. 21 illustrates a flowchart illustrating an exemplary embodiment of a method for controlling a marine vessel, including optimizing a path for the marine vessel through a waterway from a first location to a second location, in accordance with the present invention.

FIG. 21 illustrates a flowchart depicting a method 300 for optimizing a path for the marine vessel 204 though the waterway 210 from the first location 212 to the second location 214. The method 300 begins at 301 by determining 302 the first location 212, the second location 214, and a performance characteristic of the marine vessel 204 to be optimized along the path. The method 300 further includes storing 304 at least one operating parameter of the marine vessel 204 and a navigational data of the waterway 210. The method 300 further includes determining 306 an optimal path 202 for the marine vessel 204 through the waterway 210 from the first location 212 to the second location 214. The method 300 further includes determining 308 an optimal propulsion command 229 and an optimal direction command 235 to be transmitted to a respective propulsion and directional system 228,234 of the marine vessel 204 at a respective incremental location 240 along the optimal path 202, before ending at 309. The determining 306,308 steps of the optimal path, the optimal propulsion command, and the optimal direction command are based on the first location 212, the second location 214, the performance characteristic, the at least one operating parameter and the navigational data.

Those skilled in the art will readily recognize that the method 300 disclosed in the flowchart transforms the marine vessel 204, which previously did not travel along the optimal path 202, to travel along the optimal path 202 from the first location 212 to the second location 214. Furthermore, those skilled in the art will also readily recognize that the marine vessel 204 disclosed herein is a particular machine, not a general purpose machine, and thus the method 300 is tied to a particular machine.

Another embodiment relates to a method for controlling operations of a marine vessel (or combination of marine vessels) along a waterway. According to the method, the marine vessel is controlled based on an optimized mission plan, typically for reducing fuel use, reducing emissions output, or optimizing some other performance characteristic of the marine vessel. For calculating the mission plan, which includes an optimal path for the marine vessel along the waterway, navigational data and marine vessel operating parameters are received, e.g., from a database or otherwise. The navigational data includes data relating to one or more characteristics of a waterway on which the marine vessel is to travel, including, possibly, data relating to at least one speed limit along the waterway. The mission plan is created onboard the marine vessel at any time during travel of the marine vessel along the waterway. The mission plan is created at a first point along the waterway based on the received data, and covers at least a segment of the waterway extending to a second point further along the waterway than the first point. The mission plan is created based on the received data, the first and second points, and the performance characteristic of the marine vessel to be optimized, using the optimization computational methods described in detail above. The mission plan is created for covering the entirety of the segment based on, and regardless of, all the different hydrographic or geographic features or other characteristics of the waterway along the segment for which data is available. By this, it is meant: (i) the mission plan takes into consideration all the different geographic or hydrographic features or other characteristics of the route segment for which data is available, and (ii) the mission plan is created regardless of what particular geographic or hydrographic features or other characteristics of the waterway are along the segment. Thus, no matter what known geographic or hydrographic features or other waterway characteristics are along a segment, a mission plan is created for that segment. The method further comprises controlling the marine vessel according to the mission plan as the marine vessel travels along the waterway.

While the present invention has been described with reference to various exemplary embodiments, it will be understood by those skilled in the art that various changes, omissions and/or additions may be made and equivalents may be substituted for elements thereof without departing from the spirit and scope of the invention. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A system comprising:
 a memory configured to store navigational data of a waterway and at least one operating parameter of one or more of a first marine vessel and a second marine vessel coupled together as a combination of marine vessels; and
 a processor configured to determine a path for the combination of marine vessels through the waterway from a first location to a second location, the processor also configured to determine a first propulsion command for a first propulsion system of the first marine vessel, a second propulsion command for a second propulsion system of the second marine vessel, a first direction command for a first directional system of the first marine vessel, and a second direction command for a second directional system of the second marine vessel;
 wherein the first propulsion command, the second propulsion command, the first direction command, and the second direction command are determined to at least one of reduce fuel consumed, reduce emissions generated, increase energy efficiency, reduce a transit time, or decrease an arrival time at one or more locations along the path by at least one of the first marine vessel or the second marine vessel as the combination of marine vessels travel along the path relative to traveling along the path according to one or more other propulsion commands or direction commands; and wherein the path, the first propulsion command, the second propulsion command, the first direction command, and the second direction command are based on the first location, the second location, the at least one operating parameter, and the navigational data.

2. The system of claim 1, wherein the at least one operating parameter includes at least one of:
- a mass of one or more of the first marine vessel, the second marine vessel, or the combination of marine vessels,
- a drag coefficient of one or more of the first marine vessel, the second marine vessel, or the combination of marine vessels, or
- a power characteristic of one or more of the first propulsion system, the second propulsion system, or a combination of the first propulsion system and the second propulsion system.

3. The system of claim 1, further comprising a transceiver configured to be operably connected to the processor and to form a communication link with a remote control unit positioned proximate to the second location;

wherein, subsequent to the combination of marine vessels having traveled along the path to within a threshold distance of the second location, the processor is configured to cease transmission of the first propulsion command, the second propulsion command, the first direction command, and the second direction command to the first propulsion system, the second propulsion system, the first directional system, and the second directional system so that the remote control unit can transmit propulsion commands and direction commands to one or more of the first propulsion system, the second propulsion system, the first directional system, or the second directional system to control movement of the combination of marine vessels toward the second location.

4. The system of claim 1, further comprising:
- a position determination device configured to be positioned on the combination of marine vessels to determine a measured position of at least one of the first marine vessel, the second marine vessel, or the combination of marine vessels;
- wherein the path that is determined by the processor includes an expected position of at least one of the first marine vessel, the second marine vessel, or the combination of the marine vessels through the waterway from the first location to the second location; and
- wherein the processor is configured to compare the measured position with the expected position of the at least one of the first marine vessel, the second marine vessel, or the combination of marine vessels.

5. The system of claim 4, wherein, when the processor compares the measured position with the expected position and determines that the measured position deviates from the expected position by less than a designated threshold distance, the processor is configured to determine at least one of a corrective propulsion command or a corrective direction command for at least one of the first propulsion system, the second propulsion system, the first directional system, or the second directional system, the at least one of the corrective propulsion command or the corrective direction command determined to propel the combination of marine vessels toward the path.

6. The system of claim 5, wherein the processor is configured to transmit the at least one of the corrective propulsion command or the corrective direction command to an operator interface for presentation to an operator of at least one of the first marine vessel, the second marine vessel, or the combination of marine vessels to direct the operator to control the at least one of the first marine vessel, the second marine vessel, or the combination of marine vessels according to the at least one of the corrective propulsion command and or the corrective direction command.

7. The system of claim 5, wherein the processor is configured to automatically transmit the at least one of the corrective propulsion command or the corrective direction command to one or more of the first propulsion system, the second propulsion system, the first directional system, or the second directional system to autonomously guide the combination of marine vessels along the path.

8. The system of claim 4, wherein the navigational data includes at least one of a location of an obstacle within the waterway or vessel traffic within the waterway;
- wherein the processor is configured to compare the measured position with the navigational data and, if the measured position is within a predetermined threshold distance of the at least one of the location of the obstacle or the vessel traffic, the processor is configured to provide at least one of an emergency propulsion command or an emergency direction command to at least one of the first propulsion system, the second propulsion system, the first directional system, or the second directional system to avoid the at least one of the obstacle or the vessel traffic.

9. The system of claim 4, wherein the processor is configured to correct an error in at least one of the first location, the second location, the at least one operating parameter, or the navigational data that is attributable to a deviation of the measured position from the expected position.

10. The system of claim 4, wherein the processor is configured to determine a substitute path for the combination of marine vessels through the waterway from the measured position to the second location when the measured position deviates from the expected position by more than a designated threshold distance, the processor also configured to determine at least one of a substitute propulsion command or a substitute direction command for one or more of the first propulsion system, the second propulsion system, the first directional system, or the second directional system for guiding the combination of marine vessels along the substitute path.

11. The system of claim 1, further comprising:
- an operator input interface having a display and an input device, the operator input interface configured to be coupled to the processor; wherein the input device is activated to input at least one of the first location, the second location, or a designated transit time; and
- wherein the input device is configured to be activated to permit the processor to determine at least one of the path, the first propulsion command, the second propulsion command, the first direction command, or the second direction command.

12. The system of claim 1, wherein the navigational data includes at least one of a geographical map of the waterway, a location of at least one obstacle within the waterway, at least one dimension of the waterway, at least one dock location along the waterway, forecast data of the waterway, water current data of the waterway, and vessel traffic data within the waterway.

13. The system of claim 1, further comprising a transceiver configured to be operably connected to the processor and to form a communication link with a remote station located off board the combination of marine vessels, the transceiver configured to receive the at least one operating parameter or the navigational data from the remote station and to provide the at least one operating parameter or the navigational data to the processor.

14. A system comprising:
- a processor including a memory configured to store at least one operating parameter of a first marine vessel and navigational data of a waterway;
- a first propulsion system and a first directional system on the first marine vessel, the first propulsion system and the first directional system being coupled to the processor and configured to respectively impart a first selective propulsion force on the first marine vessel at a first selective direction based on a respectively received first propulsion command and first direction command from the processor; and
- at least one secondary marine vessel that is coupled to the marine vessel to form a combination of vessels;
- wherein the processor is configured to determine a path for the first marine vessel through the waterway from a first location to a second location, the first propulsion command and the first direction command to be transmitted to the first propulsion system and the first directional system at a respective incremental location along the path to improve a performance characteristic of the first marine vessel along the path; and
- wherein the processor is configured to determine the path, the first propulsion command, and the first direction command based on the first location, the second location, the at least one operating parameter, the performance characteristic, and the navigational data;
- wherein the at least one secondary vessel has a respective secondary propulsion system and a respective secondary directional system, the secondary propulsion system and the secondary directional system being coupled to the processor and configured to respectively impart a second selective propulsion force on the secondary marine vessel at a second selective direction based on a respectively received second propulsion command and second direction command from the processor;
- wherein the processor is configured to determine the path for the combination of vessels through the waterway from the first location to the second location, the respective secondary propulsion command, and the respective secondary directional command to be transmitted to the respective secondary propulsion system and the secondary directional system of the respective at least one secondary marine vessel at a respective incremental location along the optimal path to improve a respective performance characteristic of said at least one secondary marine vessel;
- wherein the memory is further configured to store at least one respective operating parameter of the at least one secondary marine vessel; and
- wherein the optimal path of the combination of vessels, the respective secondary propulsion command, and the respective secondary directional command is based on the first location, the second location, the respective at least one operating parameter of the at least one secondary vessel, the respective performance characteristic of the at least one secondary vessel, and the navigational data.

15. The system of claim 14, wherein the processor is further configured to determine a spatial arrangement of the at least one secondary marine vessel with respect to the first marine vessel; the spatial arrangement including a respective attachment location of the at least one secondary marine vessel with respect to the marine vessel;
- and wherein the determination of the respective spatial arrangement is based on at least one of the operating parameter of the first marine vessel, the operating parameter of the at least one secondary marine vessel, the navigational data, the first location, and the second location.

16. The system of claim 14, wherein the processor is one of a master processor or slave processor;
- wherein the master processor is positioned on a first one of the first marine vessel and the at least one secondary marine vessel, and wherein the slave processor is positioned on a second one of the first marine vessel and the at least one secondary marine vessel;
- wherein the master processor is configured to determine the path of the combination of vessels; and
- wherein the slave processor is configured to control the propulsion system and the directional system of the second one of the first marine vessel and the at least one secondary marine vessel, based on the path that is determined.

17. The system of claim 14, wherein: one of the first marine vessel and the at least one secondary vessel is designated as a master vessel, the processor is a master processor on the master vessel and is configured to determine the path of the combination of vessels, and wherein each of the at least one secondary vessel is designated as a slave vessel, and the system further comprises a slave processor on each slave vessel; and
- further comprising a respective transceiver configured to be positioned on the master vessel and each slave vessel and to establish a communication link; and
- a respective position determination device configured to be positioned on each slave vessel and to measure a position of the slave vessel, the position determination device configured to be coupled to the respective transceiver to communicate the position of the slave vessel that is measured to the master vessel over the communication link;
- wherein the path of the combination of vessels includes a respective expected position of each slave vessel through the waterway from the first location to the second location; and
- wherein at the respective incremental location, the master processor receives the respective measured position of each slave vessel from the respective transceiver, and the master processor is configured to compare the measured position of the slave vessel with the expected position of the slave vessel at the respective incremental location.

18. The system of claim 17, wherein, subsequent to a determination that the measured position of the slave vessel has varied with the expected position of the slave vessel by less than a predetermined threshold, the master processor is configured to transmit a corrective propulsion command and a corrective directional command to the slave vessel over the communication link such that the slave vessel is propelled toward the path; and
- wherein, subsequent to a determination that the measured position of the slave vessel has varied with the expected position of the slave vessel by greater than the predetermined threshold, the master processor is configured to determine a substitute path for the combination of vessels through the waterway from the measured position to the second location, a substitute propulsion command, and a substitute direction command of the slave vessel at a respective incremental location along the substitute path;

wherein the substitute path, the substitute propulsion command, and the substitute direction command are based on the measured position, the second location, the at least one operating parameter of the master vessel, said at least one operating parameter of the slave vessel, the performance characteristic of the slave vessel, and the navigational data.

19. A system comprising:

a processor configured to be communicatively coupled with a propulsion system and a directional system on each of a plurality of marine vessels that are coupled together to form a combination of marine vessels, the processor configured to determine a path for the combination of marine vessels to travel through a waterway from a first location to a second location, propulsion commands to direct the propulsion systems to move the combination of marine vessels along the path, and direction commands to direct the directional systems to guide the combination of marine vessels along the path, wherein the processor is configured to determine the path, the propulsion commands, and the direction commands to at least one of reduce fuel consumed by the combination of marine vessels, reduce emissions generated by the combination of marine vessels, increase energy efficiency of the combination of marine vessels, or reduce transit time of the combination of marine vessels to the second location relative to traveling along the path according to one or more other propulsion commands or other direction commands, the propulsion commands and the direction commands based on the first location, the second location, at least one respective operating parameter of the combination of marine vessels, and a navigational data of the waterway.

20. A method comprising:

determining a path for a combination of marine vessels through a waterway from a first location to a second location, the combination of marine vessels including a first marine vessel and a second marine vessel coupled together, each of the first marine vessel and the second marine vessel including a propulsion system to propel the first marine vessel and the second marine vessel and a directional system to guide the first marine vessel and the second marine vessel; and determining propulsion commands and direction commands to be transmitted to the propulsion systems and the directional systems of the combination of marine vessels as the combination of marine vessels moves along the path;

wherein the path, the propulsion commands, and the direction commands are determined to at least one of reduce fuel consumed by the combination of marine vessels, reduce emissions generated by the combination of marine vessels, increase energy efficiency of the combination of marine vessels, or reduce transit time of the combination of marine vessels to the second location relative to traveling along the path according to one or more other propulsion commands or other direction commands.

21. The method of claim 20, further comprising:

generating docking propulsion commands and docking direction commands, for transmission to the propulsion systems and the directional systems of the combination of marine vessels, respectively, for controlling movement of the combination of marine vessels when the combination of marine vessels is within a designated threshold distance from the second location that includes a docking station along the waterway;

wherein the docking propulsion commands and the docking direction commands are generated based on control signals received from a remote control unit located off board the combination of marine vessels at the docking station.

* * * * *

UNITED STATES PATENT AND TRADEMARK OFFICE
CERTIFICATE OF CORRECTION

PATENT NO. : 8,155,811 B2  
APPLICATION NO. : 12/345073  
DATED : April 10, 2012  
INVENTOR(S) : Noffsinger et al.

Page 1 of 1

It is certified that error appears in the above-identified patent and that said Letters Patent is hereby corrected as shown below:

In Column 3, Line 13, delete "liniting" and insert -- limiting --, therefor.

In Column 6, Line 18, delete "on board" and insert -- onboard --, therefor.

In Column 9, Line 30, delete "$(T_f=T_{fmin})$" and insert -- $(T_f=T_{fmin})$. --, therefor.

In Column 9, Line 47, delete "Tf." and insert -- $T_f$. --, therefor.

In Column 17, Line 34, delete "$D_{i-1}<x<D_i$." and insert -- $D_{i-1}<x\leq D_i$. --, therefor.

In Column 17, Line 66, delete "$D_{ij}=1$," and insert -- $D_{ij}$, j=1, --, therefor.

In Column 18, Line 14, delete "$1\leq j\leq N_i$," and insert -- $1\leq j<N_i$, --, therefor.

In Column 18, Line 41, delete "i<m<M," and insert -- i<m$\leq$M, --, therefor.

In Column 36, Line 10, in Claim 6, delete "and or" and insert -- or --, therefor.

In Column 38, Line 14, in Claim 16, delete "or" and insert -- or a --, therefor.

Signed and Sealed this  
Twentieth Day of November, 2012

David J. Kappos  
*Director of the United States Patent and Trademark Office*